(12) United States Patent
Albertelli et al.

(10) Patent No.: US 12,146,815 B2
(45) Date of Patent: Nov. 19, 2024

(54) SYSTEM AND METHOD FOR MONITORING HYDROGEOLOGICAL RISK

(71) Applicant: OFFICINE MACCAFERRI S.p.A., Zola Predosa (IT)

(72) Inventors: Luca Maffeo Albertelli, Darfo Boario Terme (IT); Pierluigi Bassetto, Mareno Di Piave (IT)

(73) Assignee: OFFICINE MACCAFERRI S.P.A., Zola Predosa (BO) (IT)

( * ) Notice: Subject to any disclaimer, the term of this patent is extended or adjusted under 35 U.S.C. 154(b) by 702 days.

(21) Appl. No.: 17/265,028

(22) PCT Filed: Jul. 30, 2019

(86) PCT No.: PCT/IB2019/056486
§ 371 (c)(1),
(2) Date: Feb. 1, 2021

(87) PCT Pub. No.: WO2020/026137
PCT Pub. Date: Feb. 6, 2020

(65) Prior Publication Data
US 2021/0302268 A1 Sep. 30, 2021

(30) Foreign Application Priority Data
Jul. 31, 2018 (IT) .................. 102018000007671

(51) Int. Cl.
*G01M 5/00* (2006.01)
*E01F 7/04* (2006.01)
(Continued)

(52) U.S. Cl.
CPC ........... *G01M 5/0041* (2013.01); *G01L 1/046* (2013.01); *G01L 1/127* (2013.01); *G01L 1/20* (2013.01);
(Continued)

(58) Field of Classification Search
CPC ... G01M 5/0041; G08B 21/10; G08B 25/009; G01L 1/046; G01L 1/127; G01L 1/20;
(Continued)

(56) References Cited

U.S. PATENT DOCUMENTS

2014/0012160 A1* 1/2014 Ghaffari ............... A61B 5/6885
600/587
2020/0271532 A1* 8/2020 Luo ........................ G01L 1/2287

FOREIGN PATENT DOCUMENTS

| CN | 103132468 A | 6/2013 |
| CN | 103985225 A | 8/2014 |

(Continued)

OTHER PUBLICATIONS

CN 103985225B (English Translate), Dec. 28, 2016, 14 pp. (Year: 2016).*

*Primary Examiner* — Michael J Dalbo
(74) *Attorney, Agent, or Firm* — FLYNN THIEL, P.C.

(57) ABSTRACT

The present invention describes an electronic device (2) and corresponding method for monitoring hydrogeological phenomena, in particular the integrity of a rockfall protection barrier by detecting mechanical load exceeding a threshold, such as due to impact or debris flow. The device is provided with elongated flexible "legs" protruding from the housing in a radial manner and connected to a surface to be monitored (i.e. rockfall net) for detecting mechanical stress.

18 Claims, 30 Drawing Sheets

(51) Int. Cl.
  *E02D 17/20* (2006.01)
  *G01L 1/04* (2006.01)
  *G01L 1/12* (2006.01)
  *G01L 1/20* (2006.01)
  *G08B 21/10* (2006.01)

(52) U.S. Cl.
  CPC ........... *G08B 21/10* (2013.01); *E01F 7/04* (2013.01); *E01F 7/045* (2013.01); *E02D 17/202* (2013.01)

(58) Field of Classification Search
  CPC .... G01L 1/26; E01F 7/04; E01F 7/045; E02D 17/202
  See application file for complete search history.

(56) References Cited

FOREIGN PATENT DOCUMENTS

| CN | 103985225 B | * 12/2016 | ............ G08B 21/10 |
|----|---|---|---|
| EP | 0018619 A1 | 11/1980 | |
| EP | 0760989 A1 | 3/1997 | |
| WO | 2009107104 A1 | 9/2009 | |

\* cited by examiner

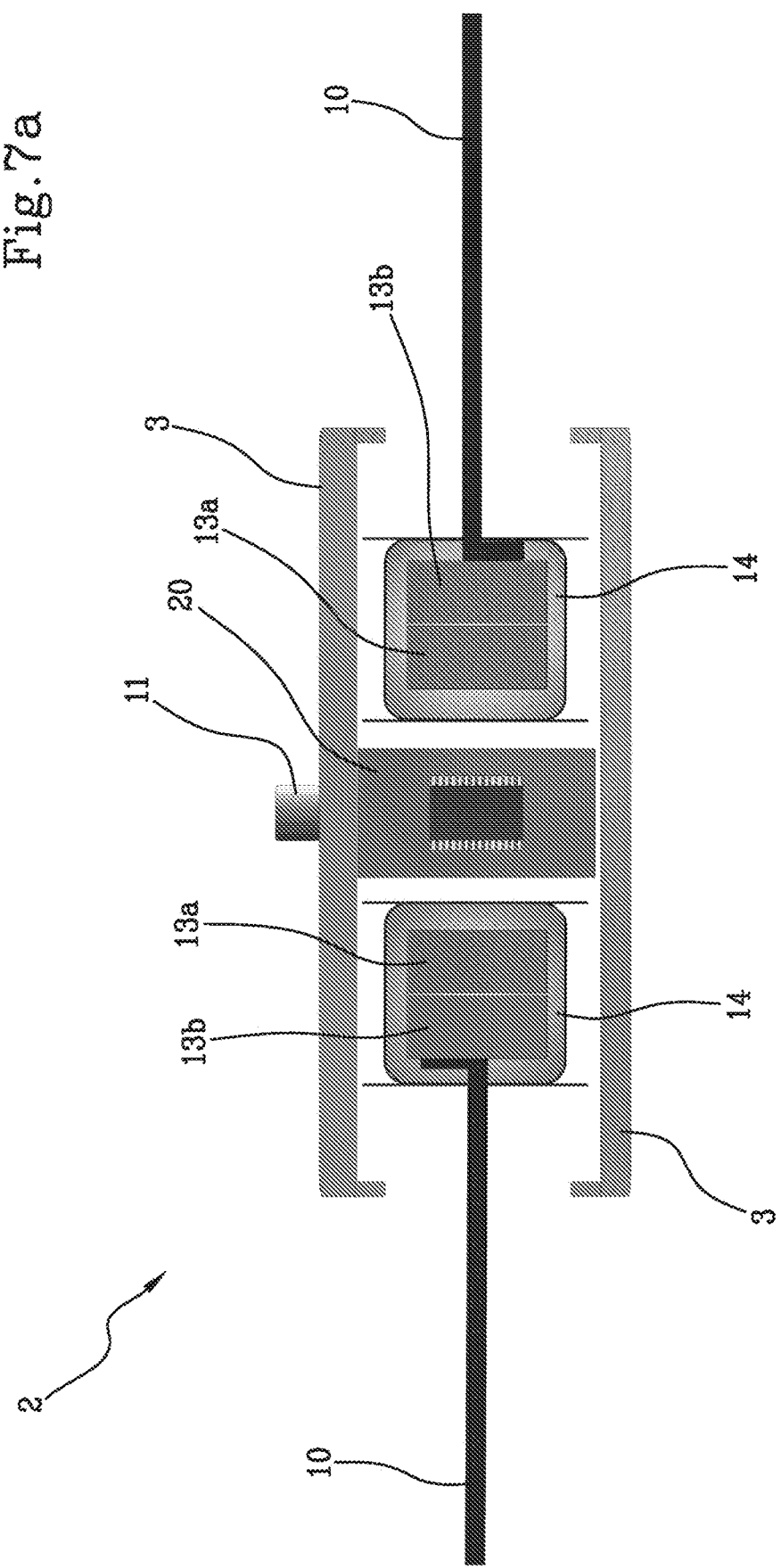

Fig.7b
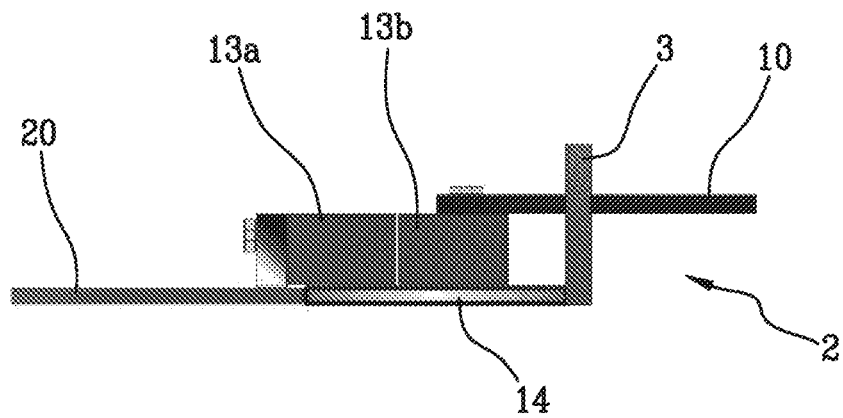
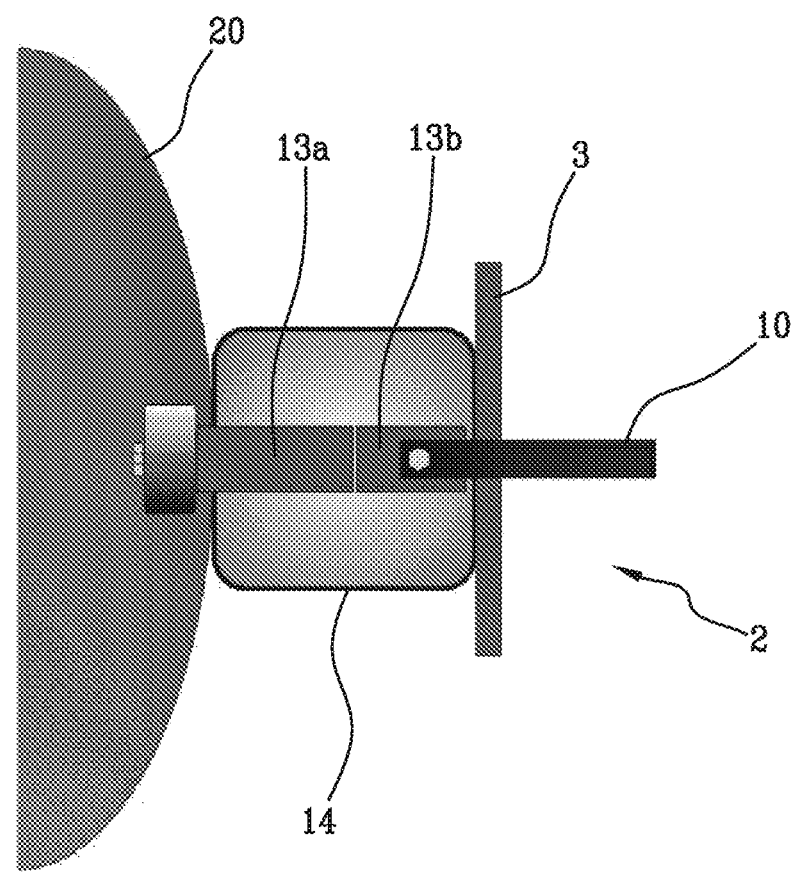
Fig.7c

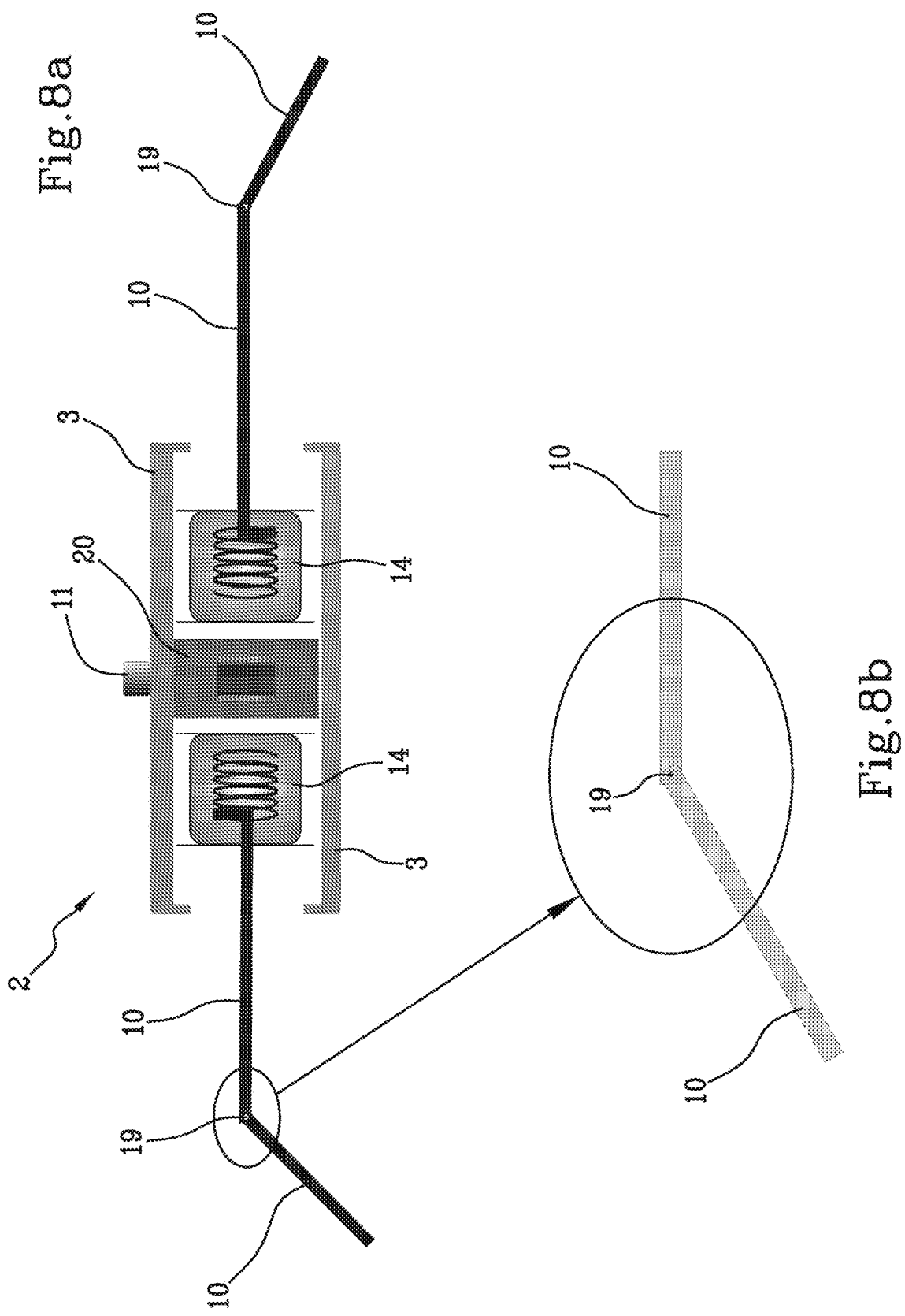

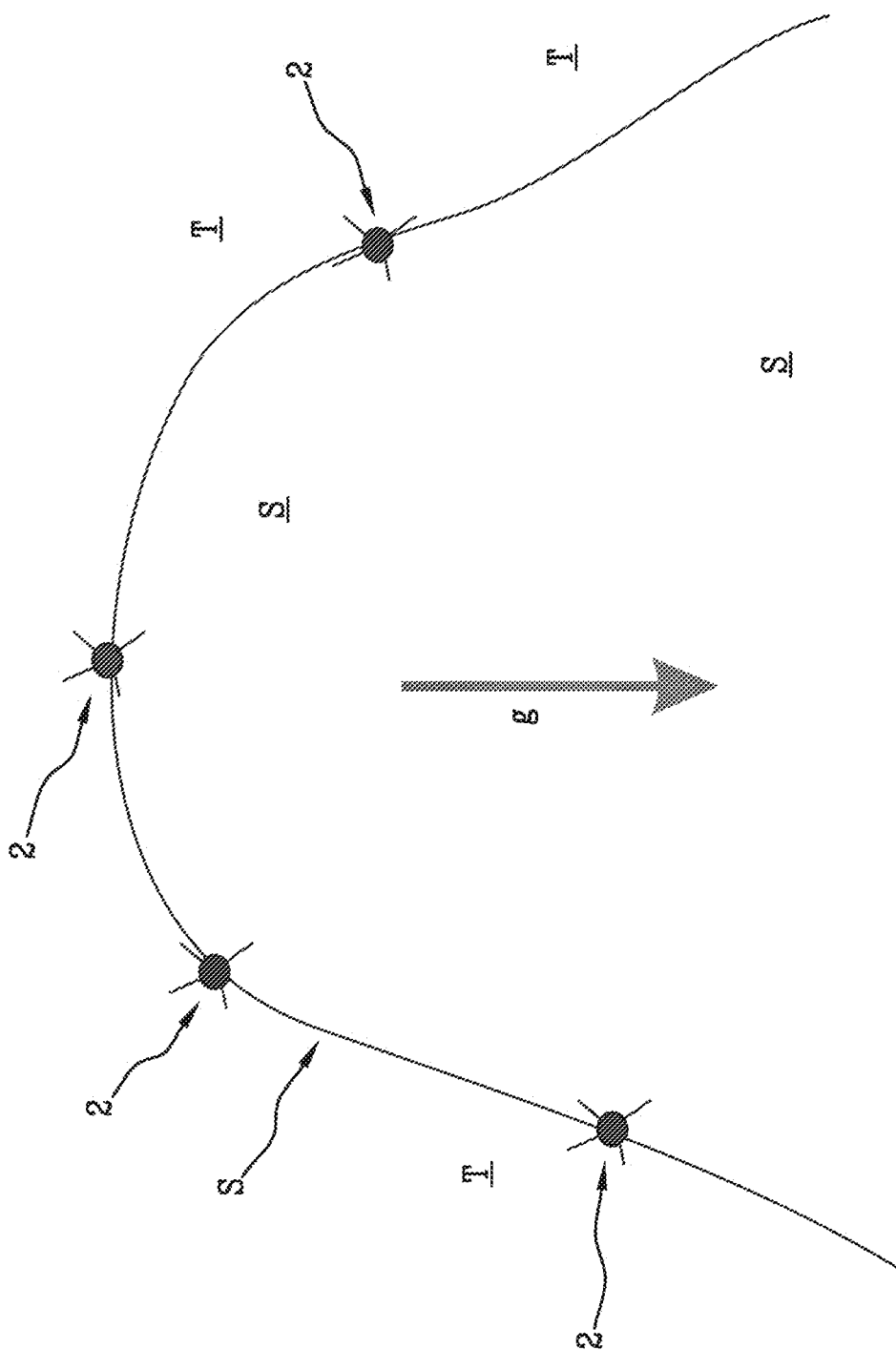

SYSTEM AND METHOD FOR MONITORING HYDROGEOLOGICAL RISK

TECHNICAL FIELD

The present invention relates to an electronic and electromechanical device, a system and a method for monitoring and alerting of hydrogeological phenomena.

In particular, the present invention relates to an electronic device, a system and a method for monitoring and alerting of hydrogeological phenomena acting on a rockfall protection barrier, a net, an adhering panel, a flexible debris barrier, a debris flow, a surface landslide, a snowslide, a bank or an embankment.

In the discussion that follows the specific example of a single electronic and electromechanical device for monitoring hydrogeological phenomena will be considered. In particular, the present invention also relates to a plurality of electronic devices for monitoring hydrogeological phenomena in data communication with each other.

Catchment basin is intended as the portion of land from which rain water or melting snow flowing on the surface collect in the same watercourse called a drainage basin.

PRIOR ART

At present the known systems for monitoring and alerting are based on robust and heavy infrastructure in terms of sensors, data transmission and installation, with high operating and implementation costs, only accessible to the highly specialised world of geotechnics, geomechanics and geology.

For example, there are few specific experiences and cases for monitoring rockfall protection barriers, and those few known situations relate to systems with multiple sensors installed to verify the structure, such as inclinometers, strain gauges on the brakes of the structures, cameras and other devices with high energy consumption and difficulties in data transmission.

To date, it is therefore not easy to obtain information on the efficiency of rockfall protection barriers, for example if the structure has been impacted by a boulder, and thus its efficiency has been compromised.

The known systems are not specific for barriers and for nets, but use sensors typically applied in general to geotechnics and adapted to the specific case from time to time.

From a usage point of view, the known systems are very limited because they require significant electricity resources to operate and expensive radio infrastructure, resulting in high costs in their installation and management, so as to prevent their use in many applications due to their inconvenience.

Often, where such systems are applied, they are in remote and inaccessible places, difficult to reach by man, not reached by the electricity grid and/or by telecommunications networks.

Furthermore, the optimal collection of information and/or hydrogeological risk alerts in real time is not always possible.

A drawback of the known monitoring systems is that it is not always possible to remotely carry out a control on the conditions of the protective devices such as rockfall protection nets, barriers, etc.

The known rockfall protection barriers are composed of individual modules that are each about 8-10 metres wide and 3-8 metres high, placed side by side to achieve the overall desired size.

To date there is no simple and specific system that provides an alert in real time in the case of impact on the rockfall protection barrier or the single module of the barrier, nor in adhering nets and all the other applications. Sensors are known that are usually used in geotechnics that are adapted to these applications from time to time.

An aim of the present invention is to provide an electronic device, a system and a method for monitoring hydrogeological phenomena which obviate the drawbacks of the prior art.

The specific aim of the present invention is to provide an electronic device, a system and a method for monitoring hydrogeological phenomena that are safe and efficient.

A further specific aim of the present invention is to provide an electronic device, a system and a method for monitoring hydrogeological phenomena that are easy to install, maintain and manage.

Another aim of the present invention is to provide an electronic device, a system and a method for monitoring hydrogeological phenomena that allow self-supplying power for a long period of time, without the need to connect to an electrical grid.

A further aim of the present invention is to provide an electronic device, a system and a method for monitoring hydrogeological phenomena that are highly reliable. A further aim of the present invention is to provide an electronic device, a system and a method for monitoring hydrogeological phenomena that are also able to transmit alarm signals in inaccessible places not covered by telecommunications networks.

OBJECT OF THE INVENTION

In general, the invention offers the following technical effects:
it allows remotely alerting and monitoring of hydrogeological phenomena in real time, both in the case of an event and post-event and in a preventive manner;
it allows monitoring hydrogeological phenomena in locations that are inaccessible and difficult to reach;
it allows a long life of the battery power supply;
it allows the transmission of alarm signals in real time even in the absence of telecommunications networks;
it allows remotely knowing the residual charge of the battery or any abnormalities of the devices;
It improves the productivity and efficiency of the monitoring of hydrogeological phenomena;
its ease of use allows wide distribution, enhancing the safety of people, infrastructure, settlements and works in general;
its simplicity of use allows its use by Civil Protection volunteers in case of an event, for the management of emergencies;
the implementation of the device with an identification system installed on each instrument (of the NFC type-Near Field Communication) allows the rapid identification of information about the device itself, the hydrogeological phenomenon or the control system of the instability (rockfall protection barrier, debris flow stopping net or barrier, etc.).

In particular, the invention allows having, in this latter case, directly on the ground (in the environment) for example for rockfall protection barriers, the data relating to dissipation energy, installation year, owner entity, etc. Furthermore, the invention allows determining the exact location where the detected phenomenon occurred, allowing targeted interventions in much less time and with certain costs.

The technical effects/advantages mentioned, and other technical effects/advantages of the invention will emerge in further detail from the description provided herein below of an example of embodiment provided by way of approximate and non-limiting example with reference to the attached drawings.

BRIEF DESCRIPTION OF THE DRAWINGS

For a better understanding of the invention and to appreciate the advantages thereof, several non-limiting example embodiments are described herein below, referring to the attached figures, in which:

FIGS. 7a, 7b and 7c show an alternative embodiment of the device of FIGS. 6a, 6b and 6c;

FIG. 8a shows an embodiment of the signalling legs of the electronic device of FIGS. 5, 6a, 6b, 6c, 7a, 7b, 7c;

FIG. 8b shows an enlarged detail of a leg of FIG. 8a;

FIG. 25 shows the application of a plurality of electronic devices at the edges of a surface landslide;

DETAILED DESCRIPTION OF PREFERRED EMBODIMENTS OF THE INVENTION

It should be observed that in the following description, identical or analogous blocks, components or modules are indicated in the figures with the same numerical references, even where they are illustrated in different embodiments of the invention.

Figure 1:
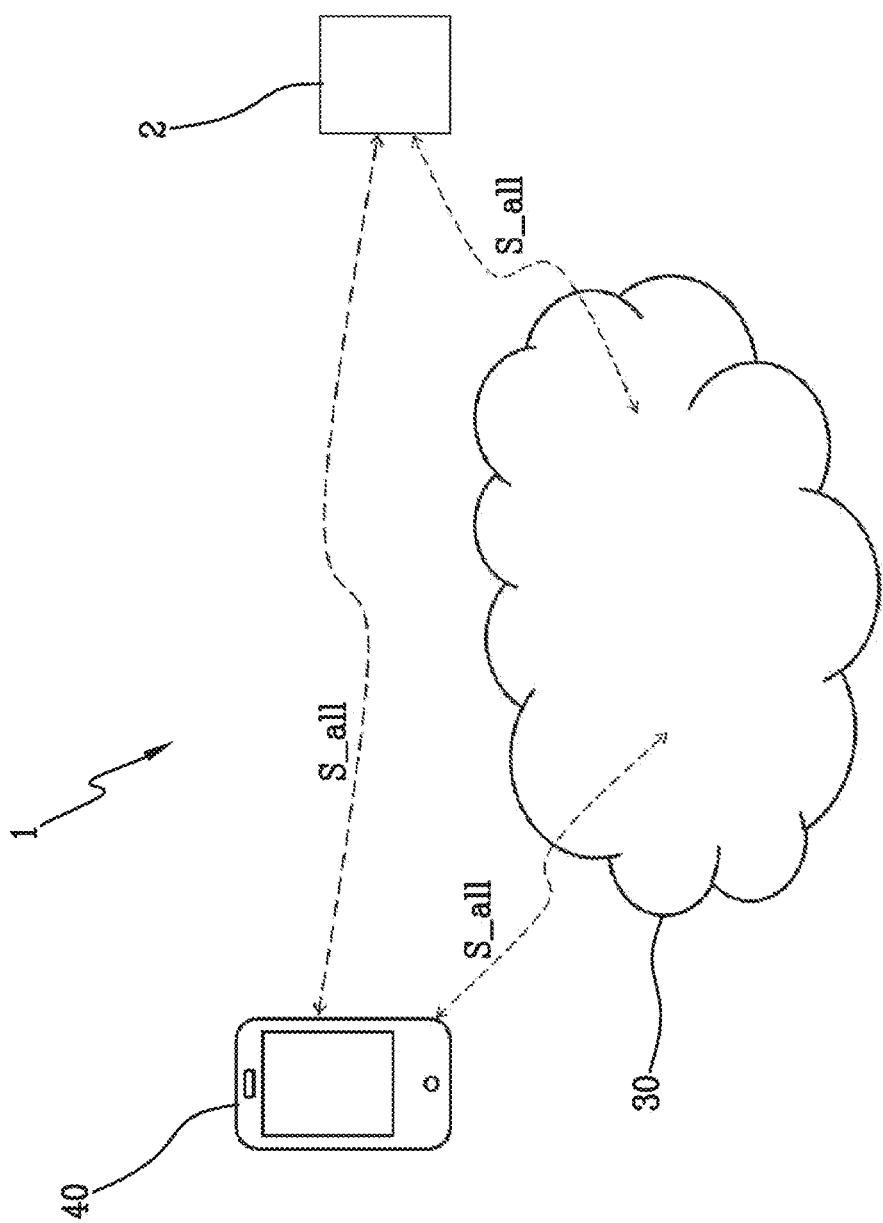
FIG. 1 shows a schematic block diagram of the system for monitoring hydrogeological phenomena according to the invention.

With reference to FIG. 1, the block diagram of the electronic system 1 for monitoring hydrogeological phenomena is shown.

The electronic system 1 for monitoring hydrogeological phenomena comprises:
- an electronic device 2 for monitoring hydrogeological phenomena;
- a wireless interactive electronic device 40;
- a telecommunications network 30.

The electronic device 2 for monitoring hydrogeological phenomena is fixed (for example by means of fixing clamps) to a control surface S or on the surface of a side or bank A near a torrential channel affected by the passage of a debris flow C1, C2, C3. The electronic device 2 can be, by means of non-limiting example, planted with a picket on the ground or on snow or fixable by any other means. Where this is not possible, it is able to operate only through the anchoring of the legs. In use, the electronic device 2 for monitoring hydrogeological phenomena is positioned on a control surface S or near a side or bank A (by means of non-limiting example, of a debris flow).

For the purposes of explaining the invention it is hereinafter assumed that the control surface S on which the electronic device 2 is applied can be, by means of non-limiting example, constituted by a rockfall protection barrier, a net, an adhering panel, a flexible barrier for stopping debris flows, of a surface landslide, a landslide, a snowslide, a bank, a slope or an embankment or the bed of a stream or river. The electronic device 2 comprises one or more sensors or detection elements 4a, 4b, 4c, 4d having the function of converting a mechanical signal Fi into an electric signal Si_ril, as will be explained in more detail below. The telecommunications network 30 has the function of connecting the interactive electronic device 40 with the electronic device 2 for monitoring hydrogeological phenomena, by means of a network element (not shown in the figure). The network element has the function of running a software program indicated hereinafter with "server program". The network element is for example a computer server.

The telecommunications network 30 can be of the fixed type (for example, Internet), mobile (for example, 2G, 3G, 4G or 5G mobile radio) or a combination of fixed and mobile. The telecommunications network 30 can be a wireless data communication network at low power for the application of the Internet of Things ("IoT"), such as for example LoRa®. In addition, each electronic device 2 is also able to send and receive data signals to another adjacent electronic device 2 and so on, up to directly reaching the interactive electronic device 40 or until reaching an electronic device 2 reached by a fixed or mobile radio telecommunications network 30 of the 2G, 3G, 4G or 5G type.

The set of the three software programs respectively run on the interactive electronic device 40, on the network element and the electronic device 2 for monitoring have the function of monitoring hydrogeological phenomena mainly through the detection of mechanical stresses (or on the control surface or on the side or bank of a torrential channel affected by the passage of a debris flow) and preferably, also the function of managing the battery and any malfunctions of the electronic devices 2, as will be explained in more detail below.

The interactive electronic device 40 has the function of receiving any alarm signals Si_all coming from one or more electronic monitoring devices 2, by means of a software program run on a processing unit of the interactive electronic device 40. The interactive electronic device 40 can be of the fixed type, such as for example a fixed personal computer or server. Alternatively, the interactive electronic device 40 is of the mobile type, such as a notebook, a smartphone or a tablet, which can transmit and receive both a long-range wireless signal S_Id (for example 2G, 3G, 4G, 5G mobile radio or LoRa®) towards one or more electronic devices 2 for monitoring hydrogeological phenomena through the network element, and a short-range wireless signal, for the purpose of controlling and interrogating the residual charge status of the battery or the functioning of a given electronic device 2.

Figure 2:
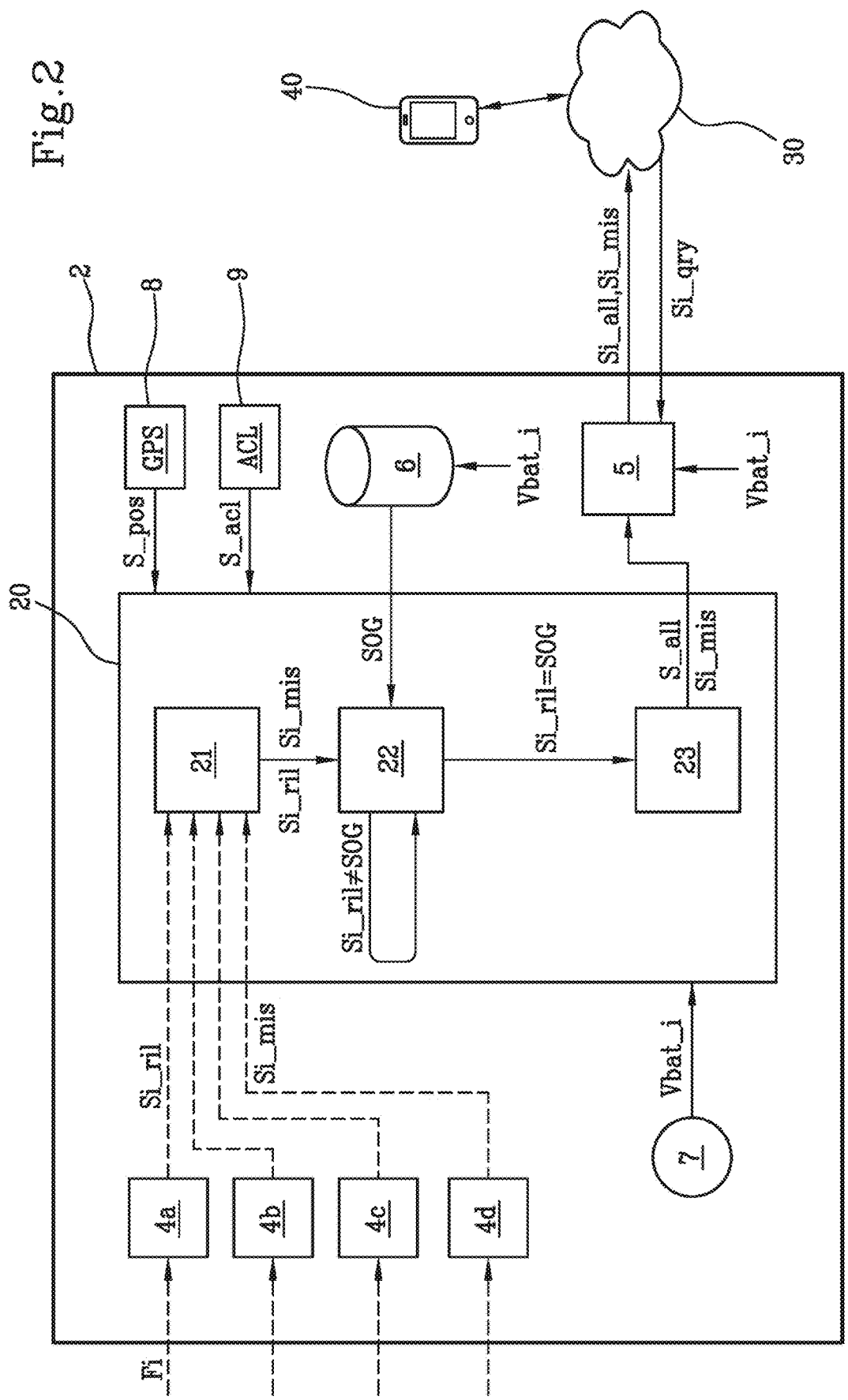
FIG. 2 shows, in greater detail, the electronic device for monitoring hydrogeological phenomena according to the invention, used in the electronic system of FIG. 1.

Alternatively, the interactive electronic device 40 is a portable personal computer. With reference to FIG. 2, the block diagram of the electronic device 2 for monitoring hydrogeological phenomena is shown which comprises:
- a box-shaped casing 3;
- one or more detection elements 4a, 4b, 4c, 4d;
- a short and/or long-range wireless signal transceiver 5;
- an electrical power supply source 7;
- a processing unit 20.

The electronic device 2 can also comprise a memory unit 6.

Preferably, each detection element 4a, 4b, 4c, 4d is a sensor or transducer configured to convert a force Fi (mechanical stress caused by the hydrogeological phenomenon) into an electric signal S_ril, S_mis; the conversion is direct and is based on the displacement of a contrast spring 12 or a magnet 13 relatively to a conductor body 14; such relative displacement converts the mechanical stress Fi into the electric signal according to the variation of resistance of the relative conductor 14. In particular, the contrast spring 12 or magnet 13 extends along a direction substantially parallel to the direction defined by a signalling leg 10 (hereinafter described in detail) to which it is connected.

In this case, when a hydrogeological event occurs, the resulting mechanical stress impacts one or more signalling legs 10, which in turn transmit the mechanical stress Fi to the detection element 4a, 4b, 4c, 4d, 4i to which each leg 10 is connected, and the relative movement between the contact element 12, 13 and the electrical contact 14 detects the occurrence of the event as such (alarm or warning).

FIGS. 6a, 6b, 6c and 7a, 7b, 8c show the detection element of a mechanical type and the magnetic element. In the first case, at both ends the spring 12 will have the classic eyelet that is fixed with a screw and bolt on one side to the leg 10 and on the other to the contact on the card, which (in turn could be magnetic or tearing) is activated in case of an event. The spring 12 is preferably dimensioned on the minimum activation energy. In the second case, it is the magnet 13 which forms both contact and calibrated resistance on the activation energy. This is fixed on one side to the leg 10, and still through a bolt, on the other side to the electronics of the device 2. In the case wherein it is necessary to detect a measuring signal S_mis of the applied mechanical force Fi (from the mechanical stress of the hydrogeological phenomenon) characteristic of the magnitude of the hydrogeological phenomenon which has occurred, each detection element 4a, 4b, 4c, 4d is constituted by a sensor or position transducer, for example a contrast spring 12 or a magnet 13 that slides on a plate or electrical contact 14. The magnitude of the displacement or position of the spring or magnet with respect to the electrical contact 14 determines the measured magnitude unit S_mis characteristic of the mechanical stress Fi and it is determined for example by a measuring element 25 (a potentiometer, a proximity sensor or other).

The electrical power supply source 7 has the function of generating a DC voltage signal of the internal battery $V_{bat\_i}$ for powering the electronic components inside the electronic device 2, such as the processing unit 20, the detection elements 4a, 4b, 4c, 4d and the signal transceiver 5. For example, the electrical power supply source 7 is an electric battery of the LIPO type ("Lithium-Ion Polymer Battery") composed of cells connected in series, such as to generate (at the terminals of the series of the cells) an internal battery voltage $V_{bat\_i}$ having a value preferably comprised between 3.3 and 15 volts depending on the number of legs 10 or of detection elements 4a, 4b, 4c, 4d connected and of the autonomy required or the transmission power.

Alternatively or in addition to the battery, photovoltaic panels 18 can be used, able to recharge the primary power supply source 7 during normal use or to provide an auxiliary charge in case of malfunction or low battery of the device 2. The wireless signal transceiver 5 can be long-range or short-range or both, and is powered by the power supply source 7.

The long-range wireless signal transceiver 5 is electrically connected with the processing unit 20 and has the function of sending a long-range wireless signal S_w_Id carrying an alarm signal S_all in the event in which it was detected by the detection elements 4a, 4b, 4c, 4d, and then forwards said alarm signal generated by the processing unit 20 towards the interactive electronic device 40; furthermore the transceiver 5 has the function of transmitting the long-range wireless signal S_w_Id carrying the signal characteristic of the mechanical force Fi detected Si-ril by the detection elements 4a, 4b, 4c, 4d, and other signals relating to the operating state of the device and/or the battery and/or the position of the device.

The long-range wireless signal S_w_ld is for example of the 2G, 3G, 4G or 5G mobile radio type or LoRa® type.

The short-range wireless signal transceiver 5 is electrically connected with the processing unit 20 and has the function of receiving a short-range wireless signal S_w_sd carrying an alarm signal S_all in the event in which it was detected by the detection elements 4a, 4b, 4c, 4d, and then forwards said alarm signal generated by the processing unit 20 towards the interactive electronic device 40; furthermore the transceiver 5 has the function of transmitting the short-range wireless signal S_w_ld carrying the signal characteristic of the mechanical force Fi detected S_ril by the detection elements 4a, 4b, 4c, 4d and other signals relating to the operating state of the device and/or the battery and/or the position of the device.

The short-range wireless signals are for example of the Bluetooth or WiFi type. The processing unit 20 is electrically connected with the transceiver 5, with the memory unit 6, with one or more detection elements 4a, 4b, 4c, 4d by means of a communication bus.

The processing unit 20 is for example a microprocessor, a microcontroller, a programmable electronic circuit or an integrated, dedicated circuit.

In general, it should be noted that in the present context and in the subsequent claims, the processing unit 20 is considered to be split into distinct functional modules (storage modules or operating modules) for the sole purpose of describing its functionalities clearly and completely.

Such processing unit can comprise a single electronic device, appropriately programmed to perform the functionalities described, and the different modules can correspond to hardware entities and/or routine software that are part of the programmed device.

Alternatively or additionally, these functions can be performed by a plurality of electronic devices on which the aforesaid functional modules can be distributed. The processing unit 20 can also make use of one or more processors for executing the instructions contained in the storage modules.

The aforementioned functional modules can also be distributed on different local or remote computers, depending on the architecture of the network in which they reside.

The processing unit 20 is configured to process the detection data of a hydrogeological alarm, any malfunctioning of the device or battery, or low battery. Each detection element 4a, 4b, 4c, 4d is connectable to a first end of one or more signalling legs 10 by means of a coupling element 16.

Each signalling leg 10 has a substantially elongated shape, and during use of the electronic device 2 for monitoring is coupled to the control surface S (for example by means of fixing clamps) or to the side or bank A of a debris flow (for example connecting the second free end to a weight or boulder directed towards the bottom or bed of the debris flow C1, C2, C3) and is configured so as to be able to transmit a mechanical stress Fi acting thereon to the detection element 4a, 4b, 4c, 4d which is connected and which in turn transforms it into an electric signal Si_ril.

In an alternative embodiment, the signalling leg 10 comprises one or more joints 19. The presence of joints 19 allows adapting the leg 10 to the shape of the net or of the surface S on which the device 2 is applied.

In particular, the signalling legs 10 extend parallel to the control surface S and are configured to transmit the mechanical load Fi acting (directly or indirectly) on the control surface S to one or more of said detection elements 4a, 4b, 4c, 4d.

Preferably, one or more detection elements 4a, 4b, 4c, 4d comprise an element capable of measuring the mechanical load and generating a signal Si_mis characteristic of the mechanical load Fi acting on the control surface S.

Preferably, the signalling legs 10 are one or more among at least bars, cables, wires or optic fibre cables.

Preferably, the electronic device 2 for monitoring includes eight signalling legs 10.

Preferably, the electronic device 2 is fixed in a substantially central position of the control surface S to be monitored, as shown in FIGS. 9, 10, 11, 12, 13, 14, 15, 16, 17, 23, 24 and 26.

Figure 31:
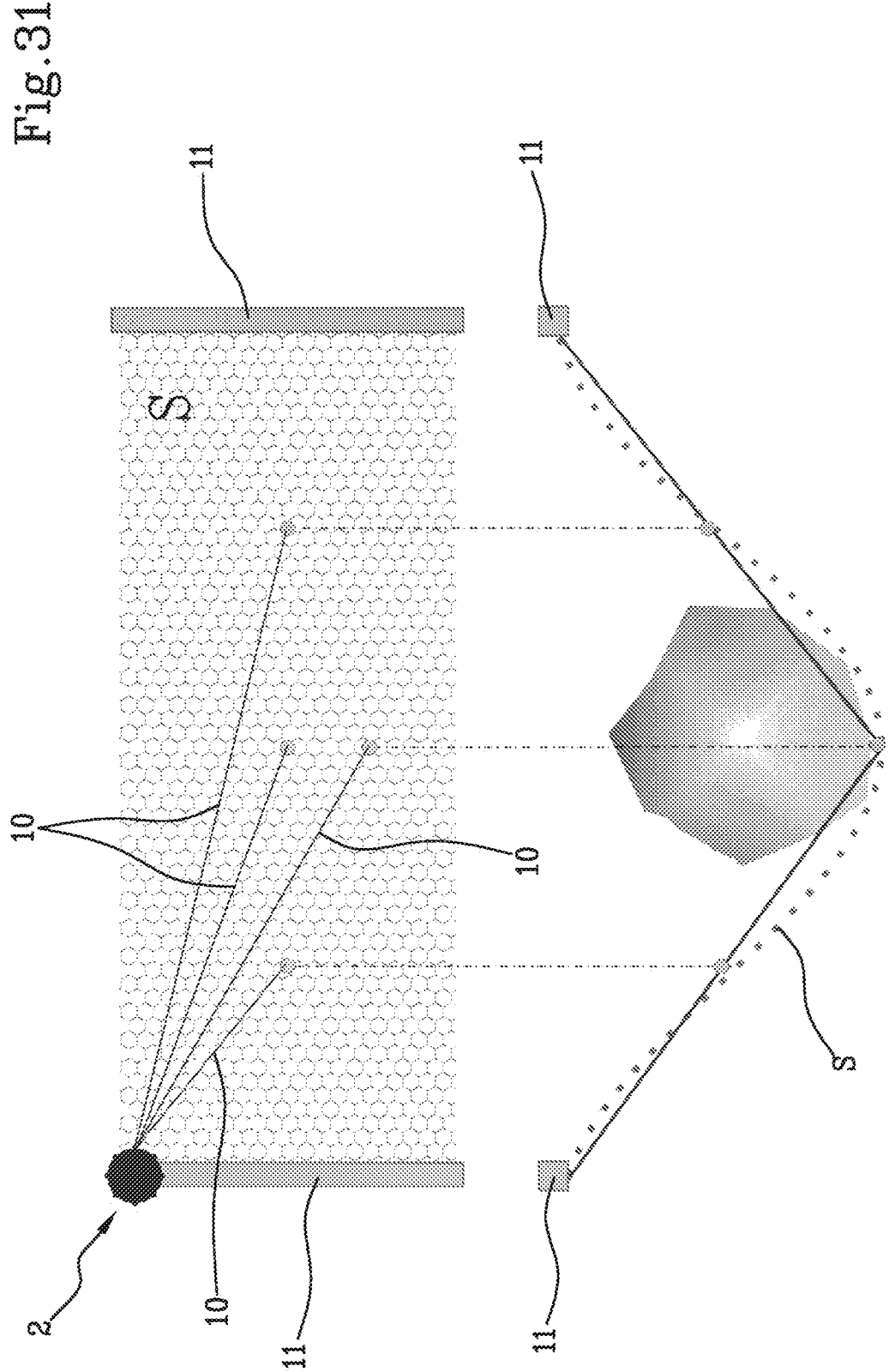
FIG. 31 shows an embodiment of the electronic device applied to the side upright of a rockfall net, in a perspective and plan view.
Figure 32:
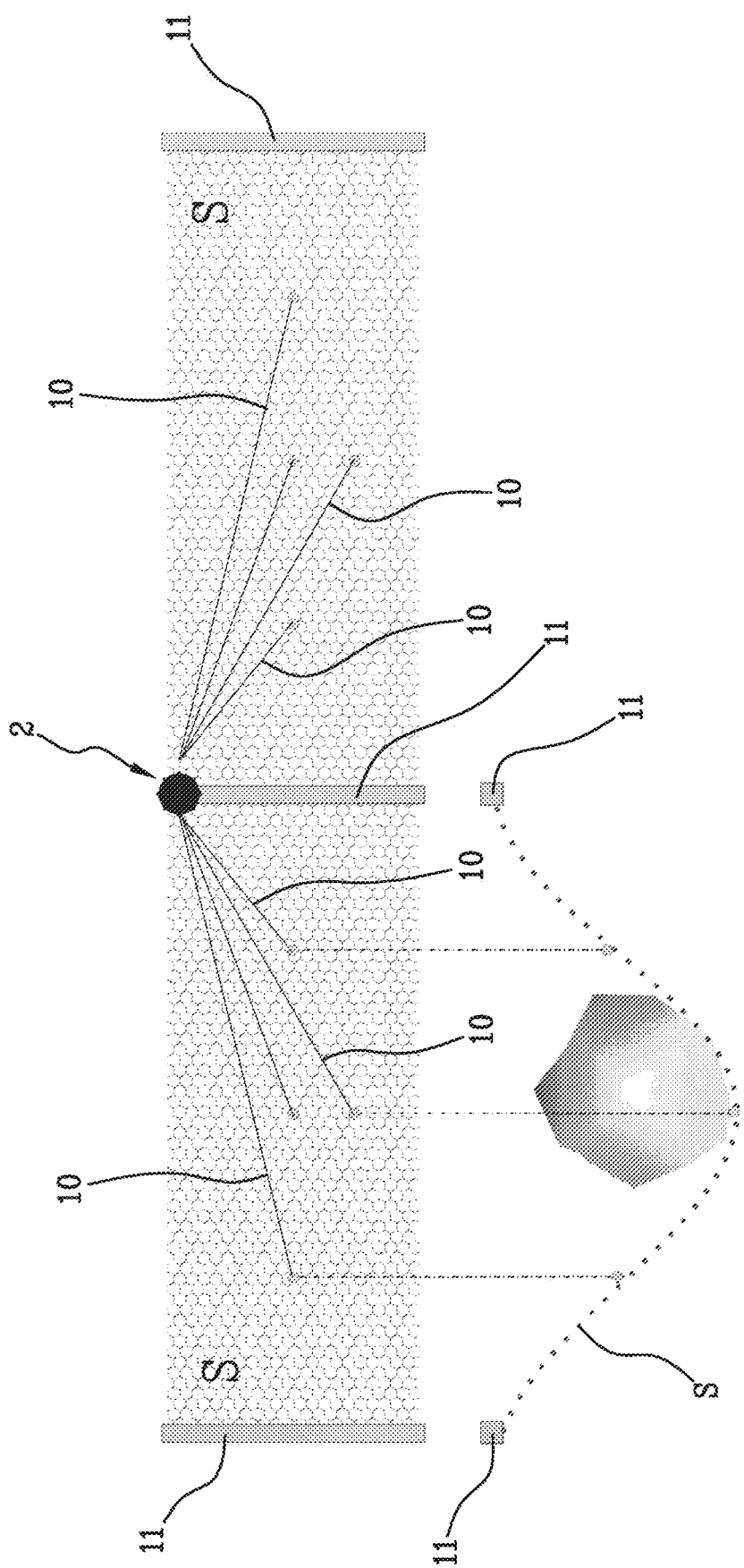
FIG. 32 shows an embodiment of the electronic device applied to the central upright of a rockfall net, in a perspective and plan view.
Figure 33:
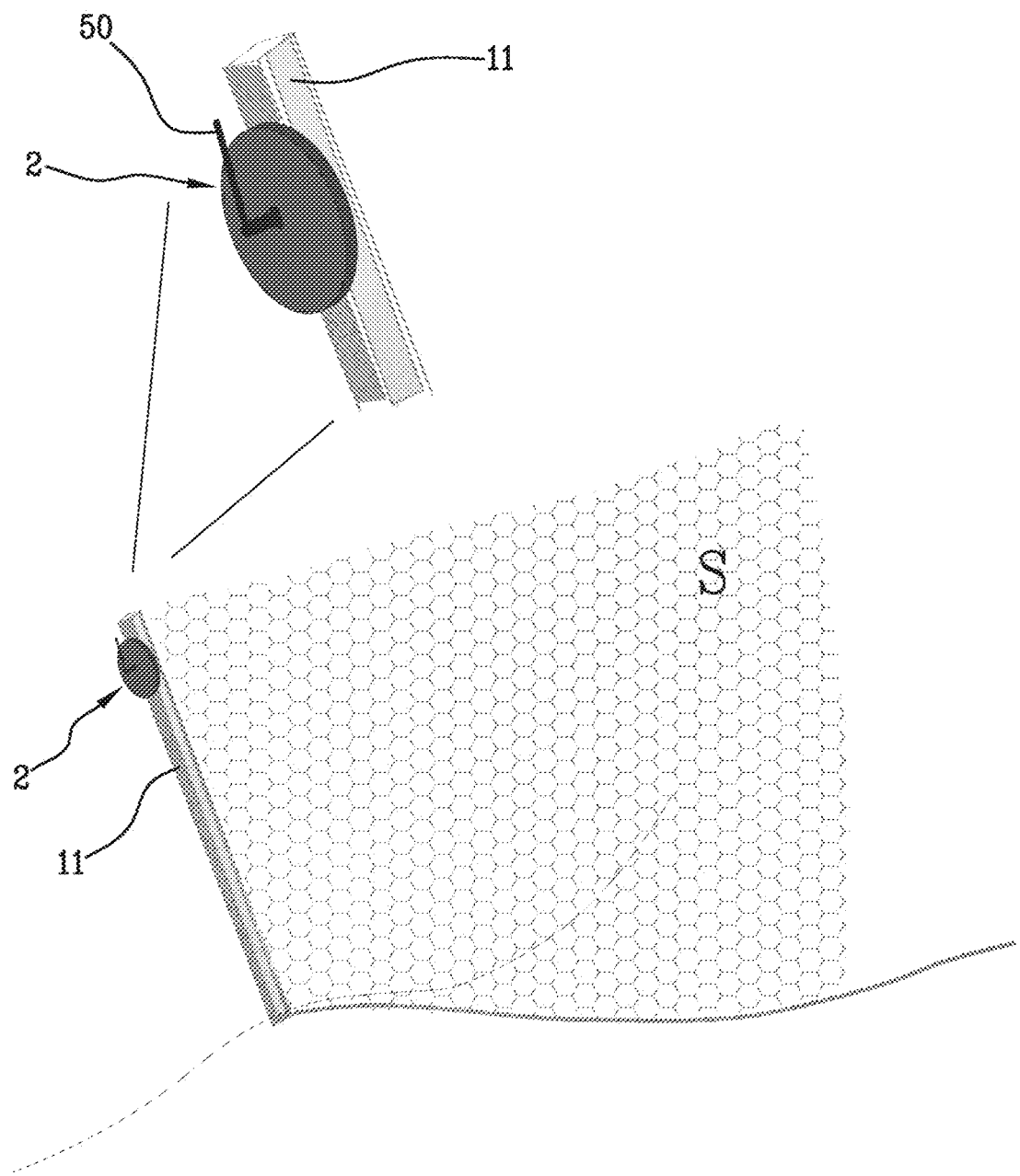
FIG. 33 shows a detail of the electronic device fixed to the upright of a rockfall net.

In an alternative embodiment of the present invention, the electronic device 2 is fixed on the central and/or side upright 11 (as shown in FIGS. 31 and 32, respectively), by means of screws or metal bands (as shown in FIG. 33) or equivalent fixing elements, so that the electronic device is solidly constrained to it.

Figure 30:
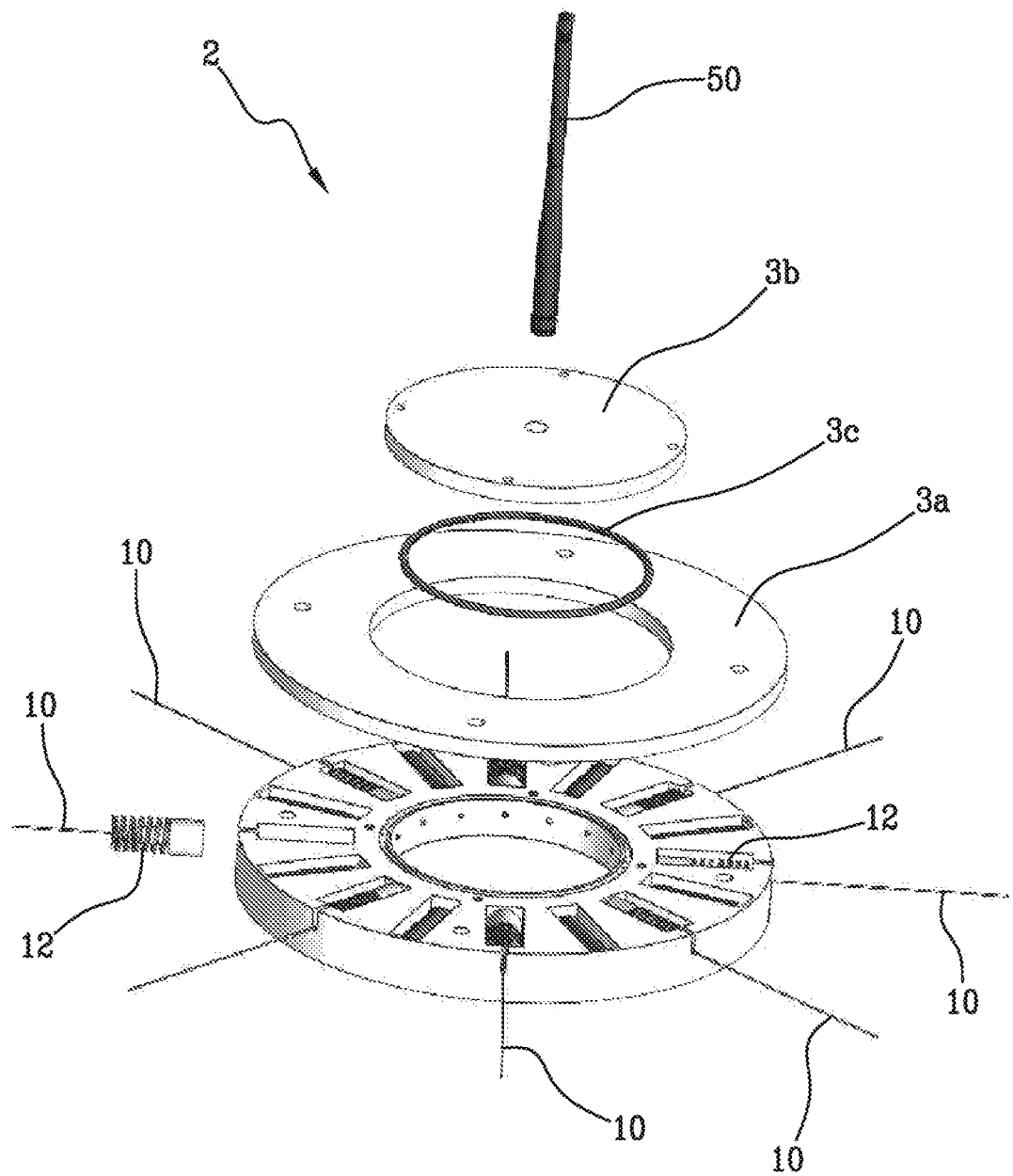
FIG. 30 shows an enlarged view of the electronic device for monitoring hydrogeological phenomena according to the invention used in the electronic system of FIG. 1 in the alert configuration for rockfall protection barriers.

In one or more panels S of the rockfall net, the signalling wires or legs 10 of the sensors are positioned in a minimum number of two legs 10 up to a maximum that depends on the electronics used, but can be, for example, in multiples of eight legs 10. The length of each signalling leg 10, which departs from the electronic device 2 and clamps on the net S, depends on the deformation coefficients of the net S, namely the energies for which the nets S are sized to withstand various types of impacts (in jargon "Energy Classes"). The signalling legs 10 can be wires with a diameter varying from 1 mm to 15 mm, preferably from 1 mm to 7 mm, made of steel or other material, calculated to intervene on the expected deformation length of the net S at the established Energy Class. In one embodiment of the invention, it is possible to obtain on the same rockfall net devices 2 clamped to the upright 11 and/or within the net S. FIG. 30 shows an electronic device 2 according to one embodiment, shaped substantially cylindrical, comprising a box-shaped casing 3, a first cover 3a, a sealing gasket 3c, an upper cover 3b and an antenna 50.

Preferably, the first cover 3a covers the area comprising the sensors 12, 13 and the electronics, while the second cover 3b covers the inner part of the device 2. The box-shaped casing 3 of the electronic device 2, as well as being substantially cylindrical or rounded, can also be of a square and/or rectangular shape.

Preferably, the signalling legs 10 extend in spoke-like fashion from the electronic device 2.

Preferably, the signalling legs 10 are substantially parallel to the control surface S.

Each signalling leg 10 has the function of sensing every slightest vibration or mechanical stress acting on the control surface S. In particular, each leg 10 senses the stretching or tearing that takes place directly along the same leg and/or in the control surface S to which the leg 10 is connected.

The legs 10 can be connected to a containment net, directly to a ground, a surface, or a system of beams.

A mechanical stress or force Fi acting on the control surface S is mechanically transmitted to one or more legs 10 and determines a signal variation which is appropriately detected by the detection element 4a, 4b, 4c, 4d (to which they are connected) and processed by the processing unit 20, resulting in the sending of a danger or alarm signal Si_all to the interactive electronic device 40.

Figure 27:
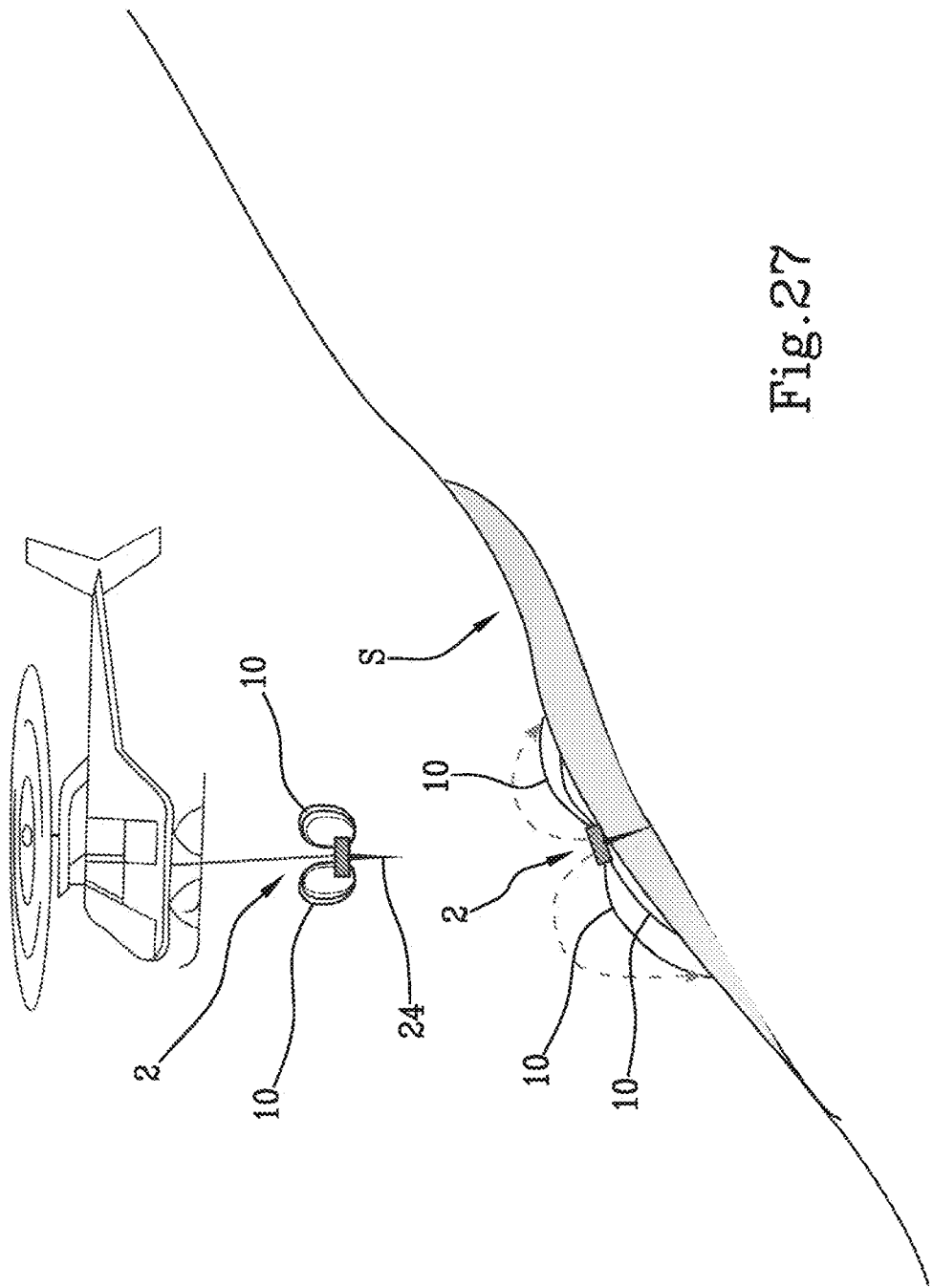
FIG. 27 shows a plurality of electronic devices of FIG. 26 applied to a snowslide.
Figure 28:
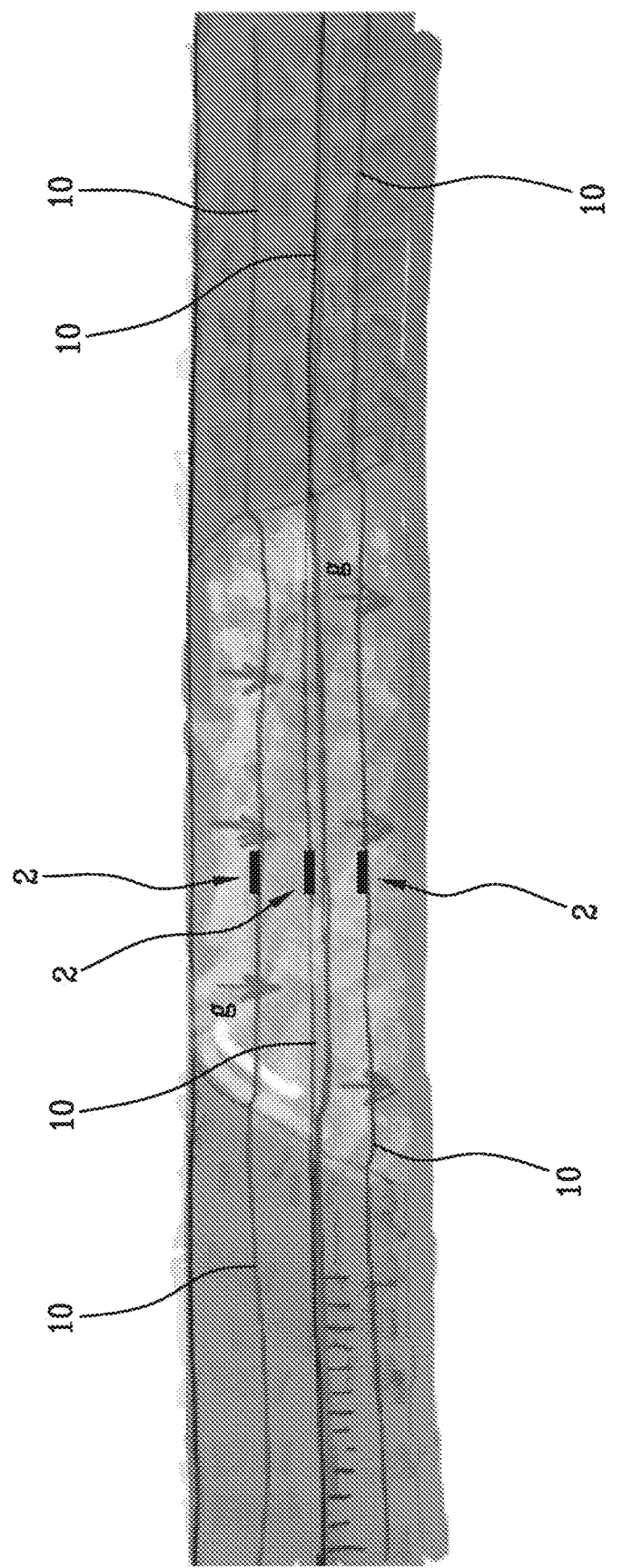
FIG. 28 shows an embodiment applicable to banks.
Figure 29:
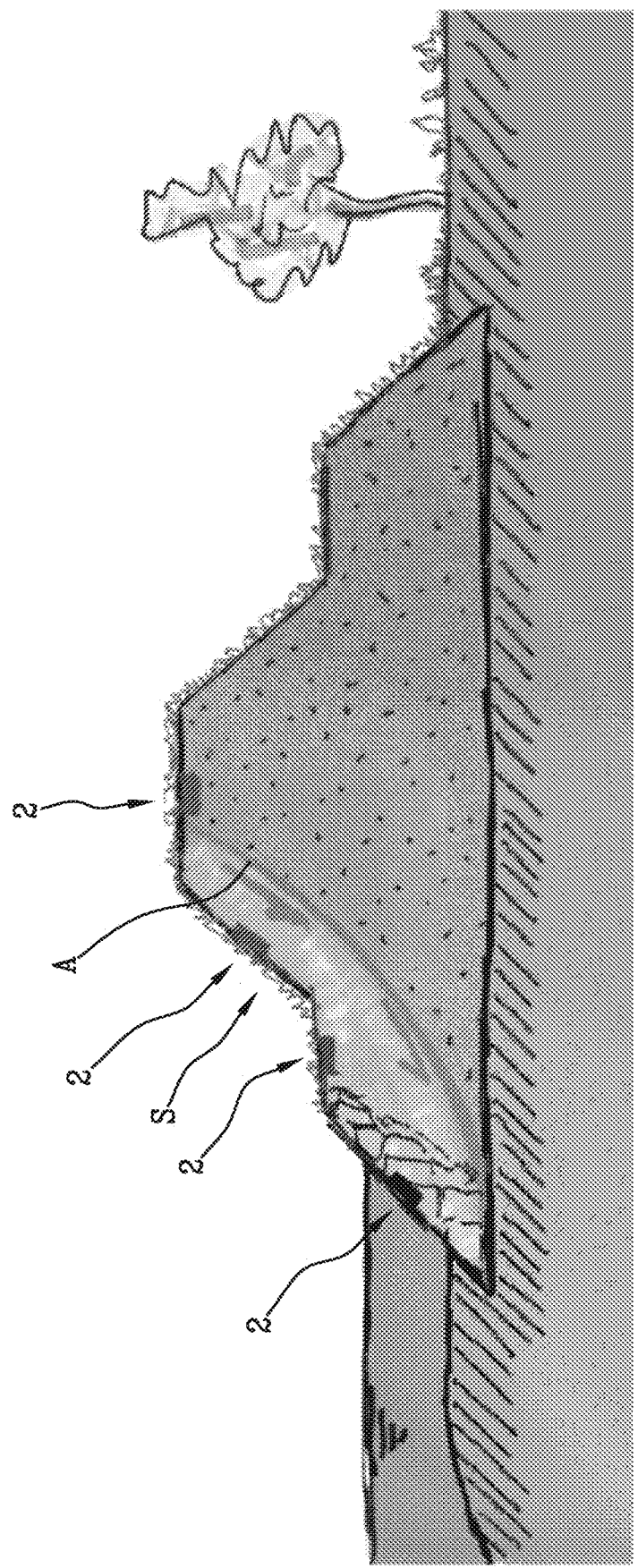
FIG. 29 shows the embodiment of FIG. 28 in section.

The electronic device 2 according to the present invention is applicable to one or more among at least a rockfall protection barrier (FIGS. 9, 10, 11, 12 and 13), an adhering net or panel (FIGS. 14 and 15), a flexible barrier for stopping debris flows (FIGS. 16 and 17), a catchment area affected by the passage of a debris flow (FIGS. 18, 19 and 20) a surface landslide (FIGS. 21, 22, 23, 24 and 25), a snowslide (FIGS. 26 and 27), or a bank A (FIGS. 28 and 29).

According to a possible embodiment of the invention, the electronic device 2 further comprises a receiver 8 of the geographical position on Earth of the electronic device 2, for example a satellite of the GPS type (Global Positioning System): in this case the electronic device 2 is able to provide the interactive electronic device 40 with the position in which it is installed.

According to this embodiment, the power supply source 7 is such as to further supply the geographical position receiver 8.

In this embodiment, the processing unit 20 is further electrically connected to the geographical position receiver 8.

The wireless signal transceiver 5 is further configured to transmit, in addition to the alarm signal S_all, also the geographical position of the device 2.

The use of the geographical position receiver 8 allows determining the position in which the electronic device 2 that has generated the alarm signal Si_all is located, received from the signal detector 4a, 4b, 4c, 4d of the i-th electronic device 2.

Preferably, the electronic device 2 further comprises an accelerometer 9 configured to detect vibrations and mechanical shocks acting directly or indirectly on the electronic device 2. According to this embodiment, the power supply source 7 is such as to further supply the accelerometer 9. Furthermore, the processing unit 20 is further electrically connected to the accelerometer 9.

According to a possible embodiment of the invention, the electronic device 2 further comprises an electronic device that allows a mobile system (smartphone, tablet or other), when approached, to provide identifying information of the device, the system (barrier, net or other) and the instability event. Based on NFC technology, this system would allow the Civil Protection operators, those responsible for works, maintenance controllers, etc. to directly check technical data on-site that are typically difficult to obtain. In this sense, the electronic device also acts as a database to provide both information and alerts.

In a first aspect, the present invention describes an electronic device for monitoring hydrogeological phenomena adapted to detect the stresses on a control surface S that can be the surface of a containment element (e.g., rockfall protection barrier, net, adhering panel) or directly the surface of the hydrogeological phenomenon to be monitored (for example, surface landslide, snowslide, bank).

With particular reference to FIGS. 9, 10, 11, 12, 13, 14, 15, 16, 17, the electronic device for monitoring hydrogeological phenomena adapted to detect the stresses on a control surface S is arranged within a box-shaped casing 3, the lower surface of which is rested on the control surface S.

The electronic device 2 according to the present invention comprises one or more detection elements 4a, 4b, 4c, 4d configured to convert a mechanical signal Fi into an electric signal Si_ril characteristic of the mechanical load acting on the control surface of S.

The electronic device 2 also comprises a signal transceiver 5 configured to transmit and receive data (short, medium and/or long-range), a memory unit 6 comprising a threshold value SOG; an electrical power supply source 7 configured to power the various elements of the device 2 and a processing unit 20, in connection with each of said detection elements 4a, 4b, 4c, 4d and with said signal transceiver 5, configured to process hydrogeological risk monitoring data. The processing unit 20 comprises an input module 21 configured to receive said signal Si_ril from each of the detection elements 4a, 4b, 4c, 4d; a comparison module 22 configured to compare the signal Si_ril with a corresponding threshold value SOG; a transmission module 23 configured to transmit to the signal transceiver 5 an alarm signal S_all as a function of a match OK resulting from the comparison carried out by said comparison module 22.

In addition, the processing unit 20 is advantageously configured to switch, as a function of the signals S_all; S_mis; S_bat possibly received from one or more of said detection elements 4a, 4b, 4c, 4d, the state of the electronic device 2 from a normal operating mode, wherein signal transceiver 5 of the electronic device 2 is able to transmit the signals S_all; S_mis; S_bat, to a standby mode, during which the electronic device 2 is such as to operate while minimising the consumption of electricity generated by the electric power supply source 7. This arrangement allows further saving the duration of the power supply source 7.

Figure 9:
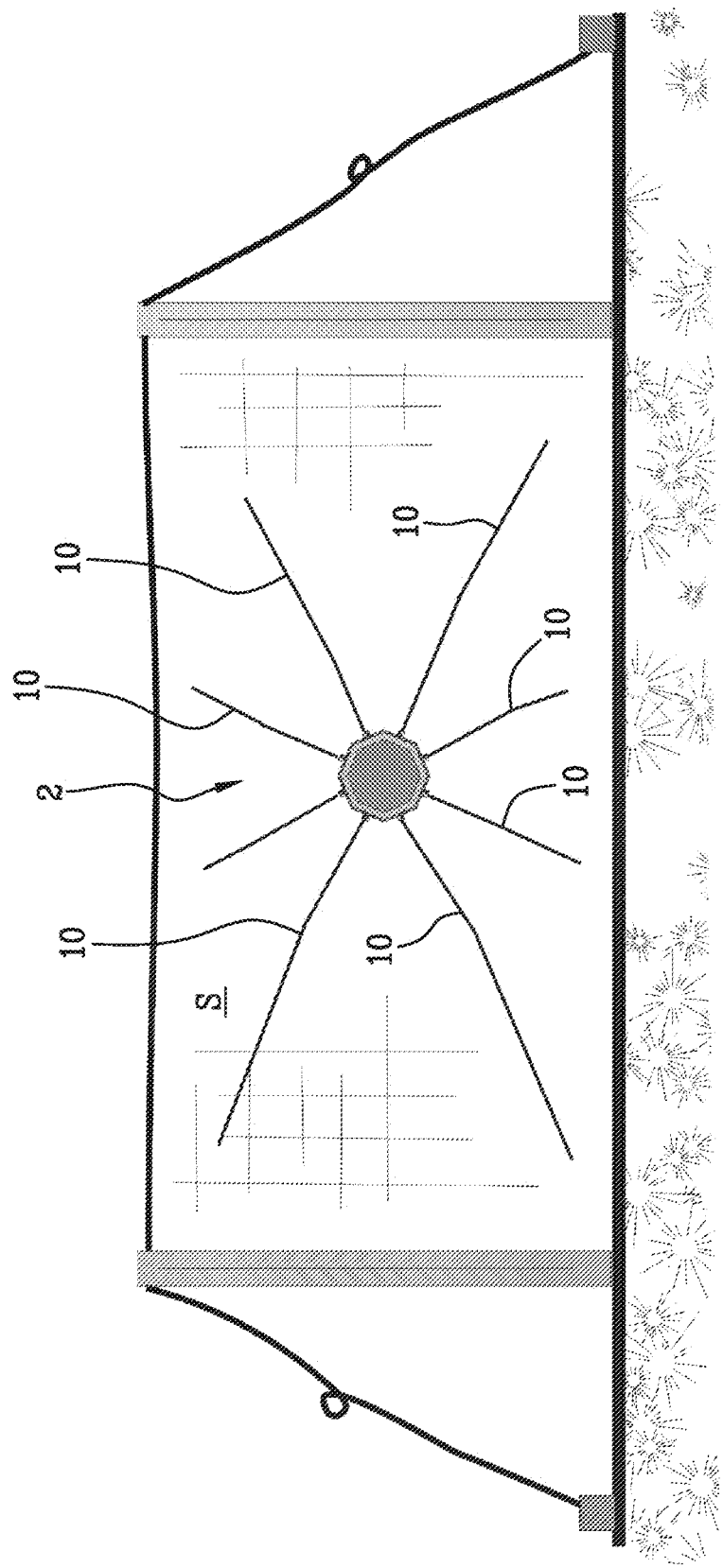
FIG. 9 shows a single module of a rockfall protection barrier in front view comprising an electronic device according to the invention.
Figure 10:
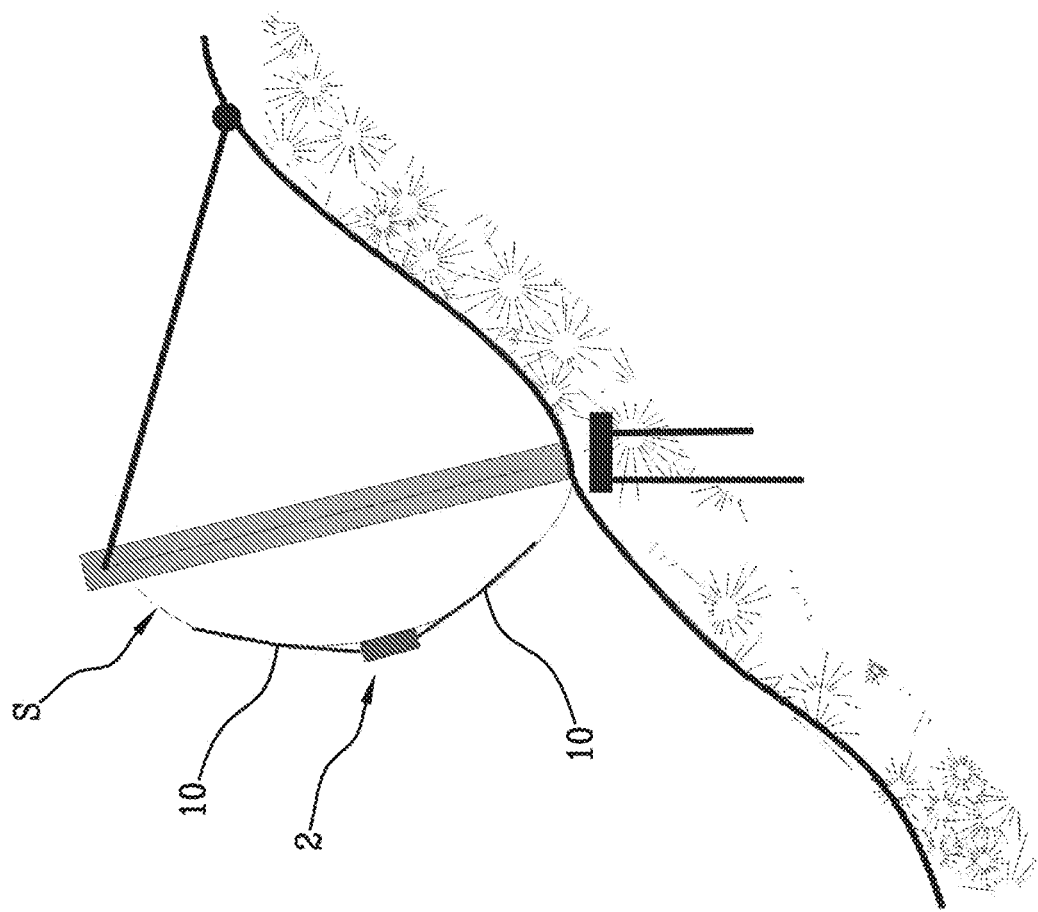
FIG. 10 shows the rockfall protection barrier of FIG. 9 in a side view.
Figure 11:
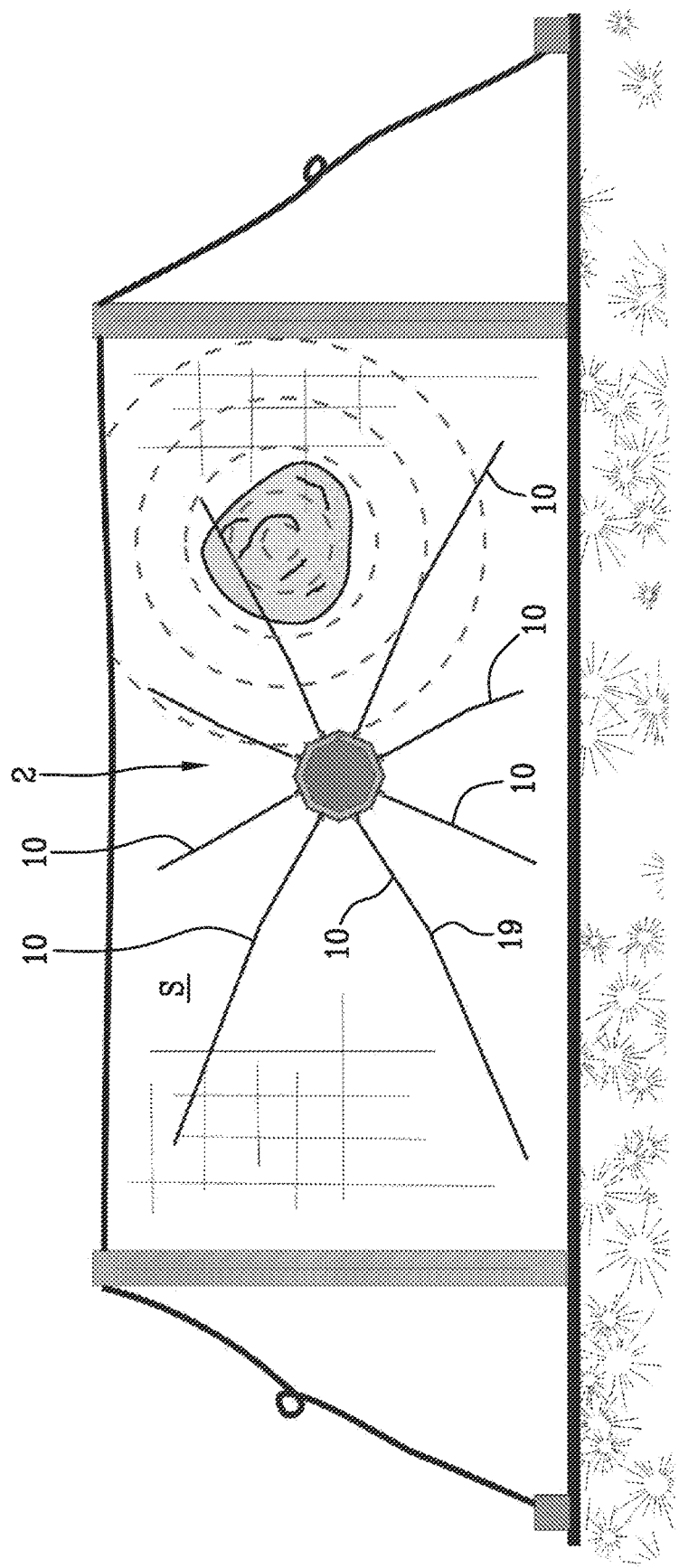
FIG. 11 shows the rockfall protection barrier of FIG. 9, while it is being hit by a boulder.
Figure 12:
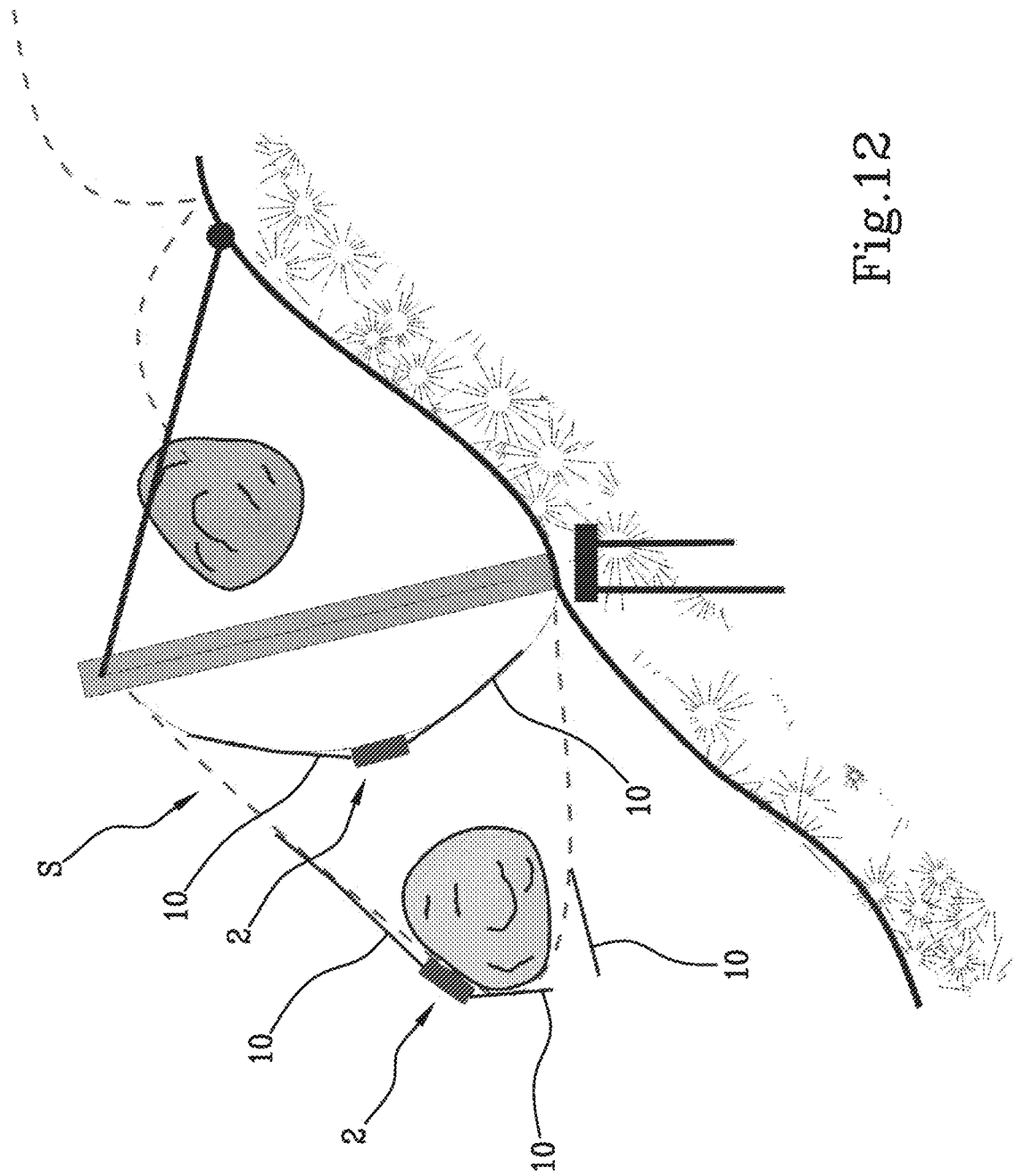
FIG. 12 shows a side view of the rockfall protection barrier of FIG. 11.
Figure 13:
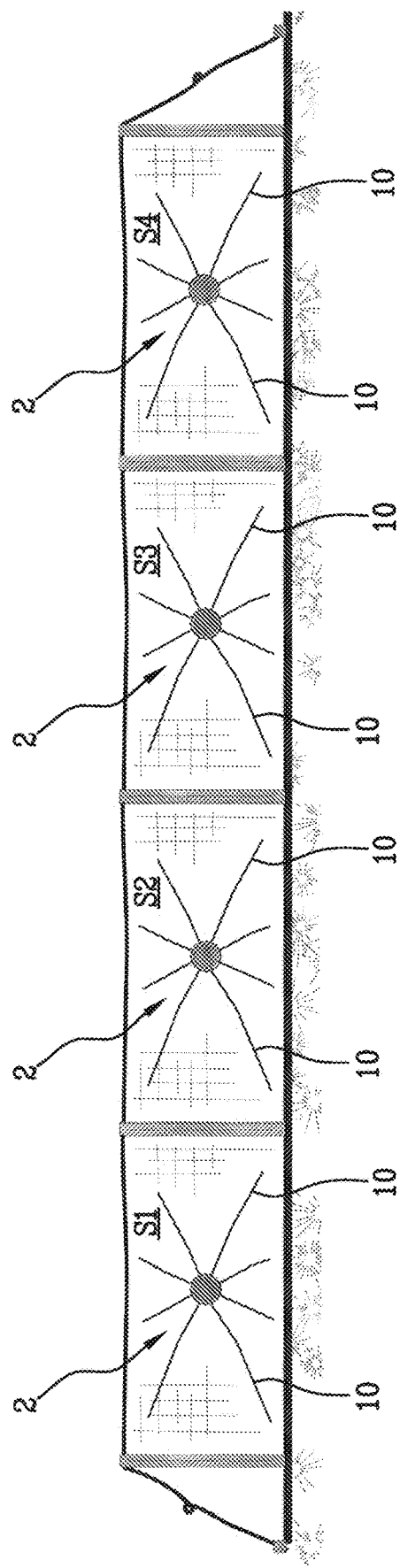
FIG. 13 shows a front view of a rockfall protection barrier composed of several adjacent modules similar to that of FIGS. 9 and 10.
Figure 14:
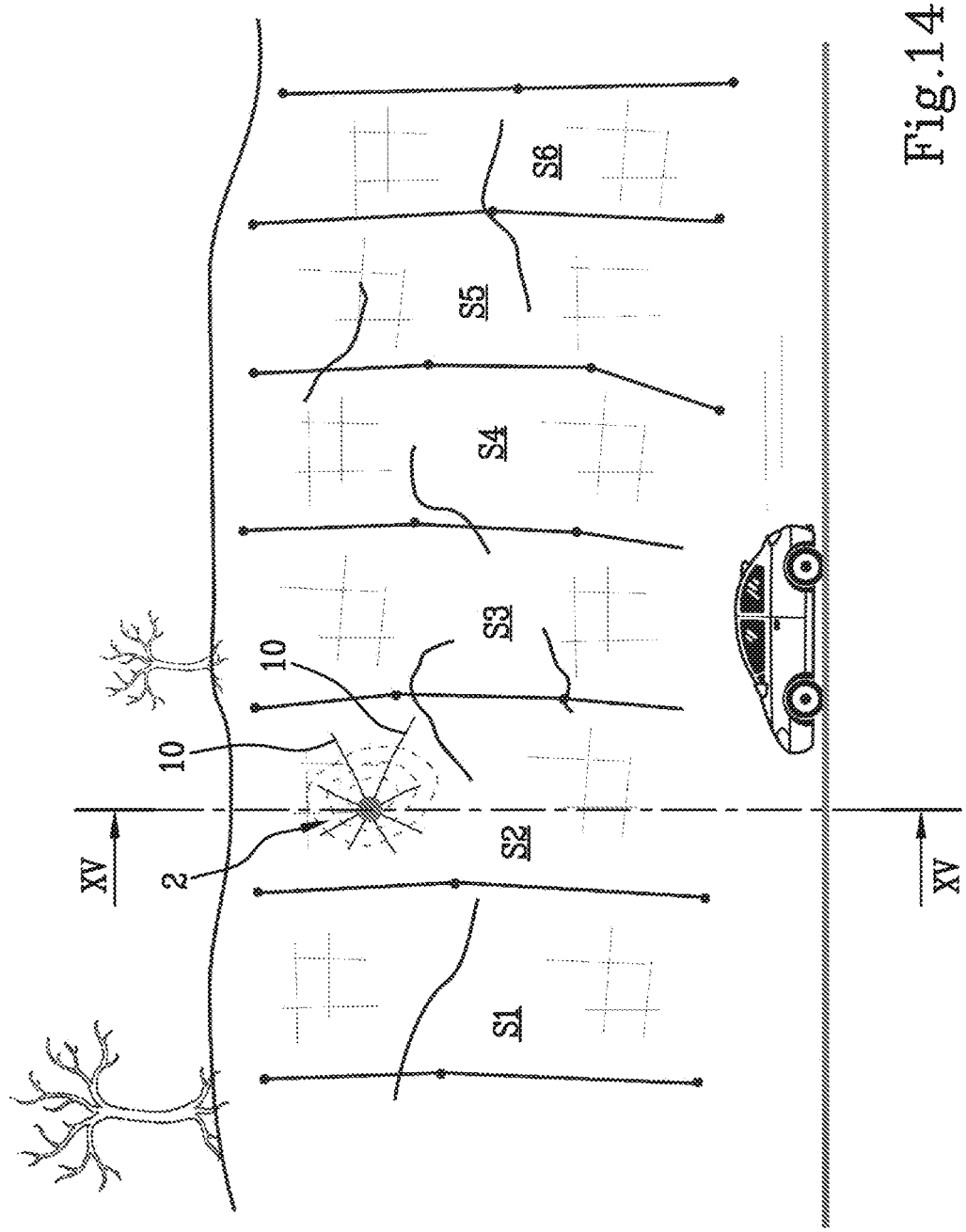
FIG. 14 shows a front view of a net or panel adhering to a mountain or hill ridge with an electronic device applied, according to another use of the electronic device of the invention.
Figure 15:
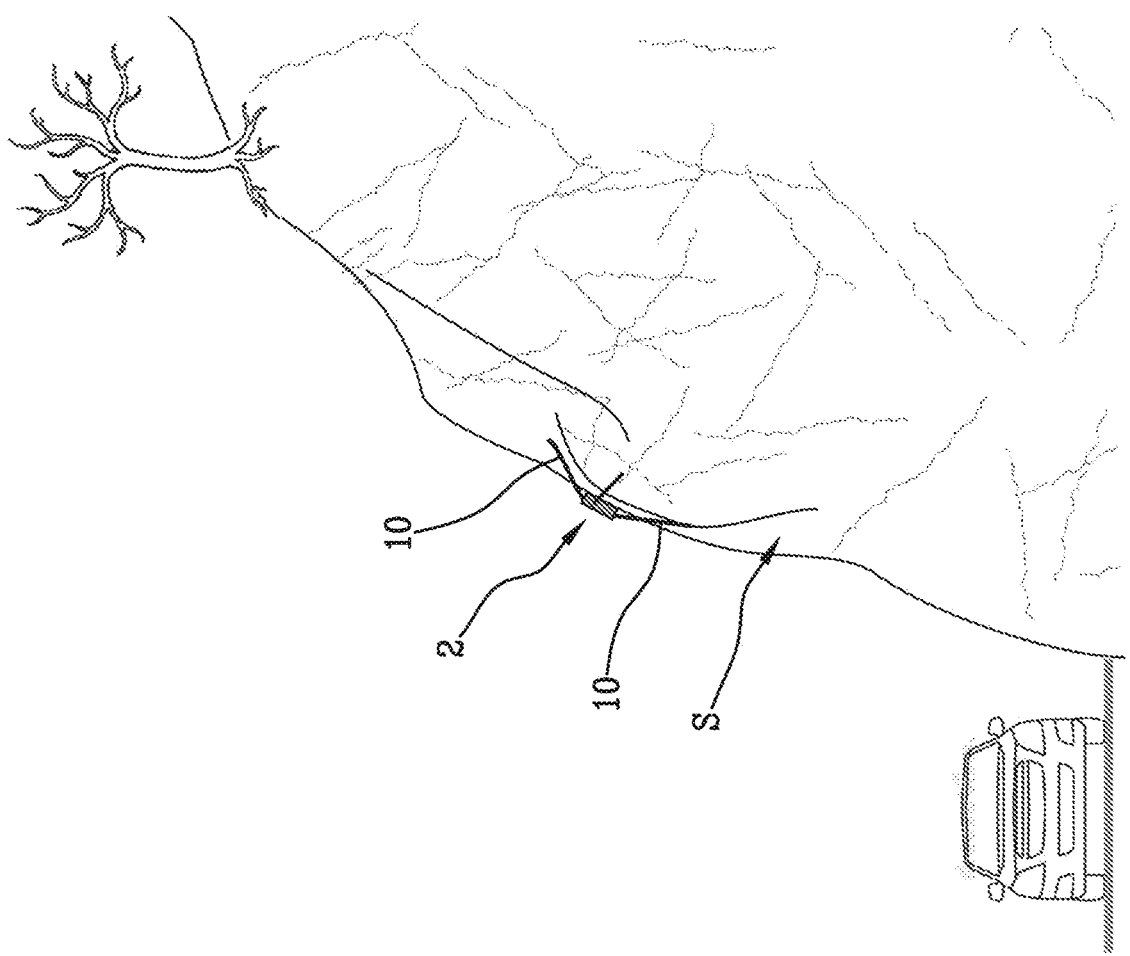
FIG. 15 shows a view of the section XV-XV of the net or panel of FIG. 14.
Figure 17:
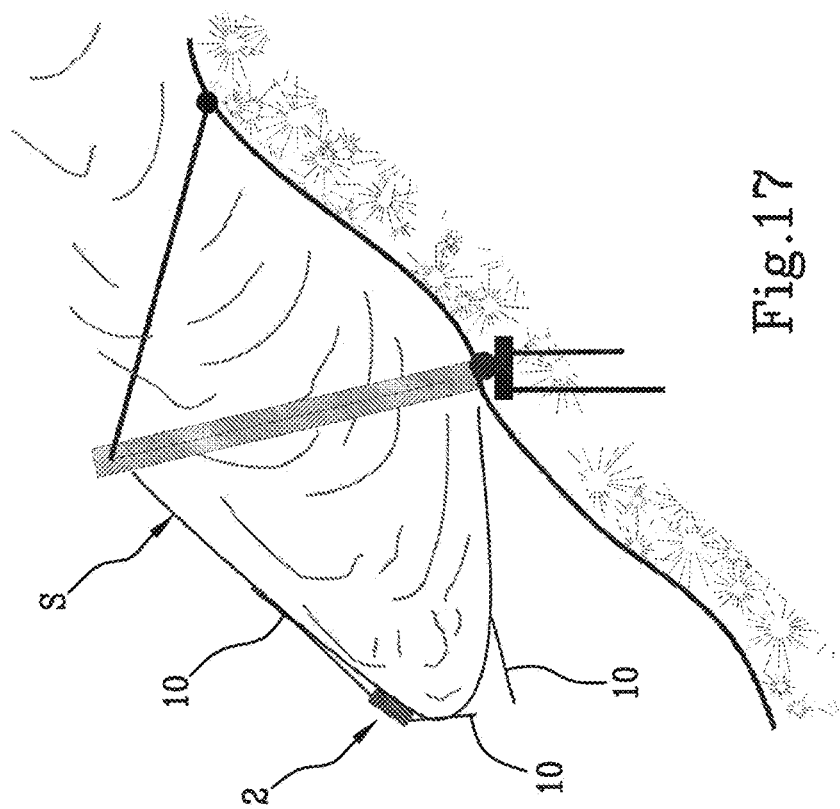
FIG. 17 shows a front view of the flexible barrier for debris flows of FIG. 16.
Figure 16:
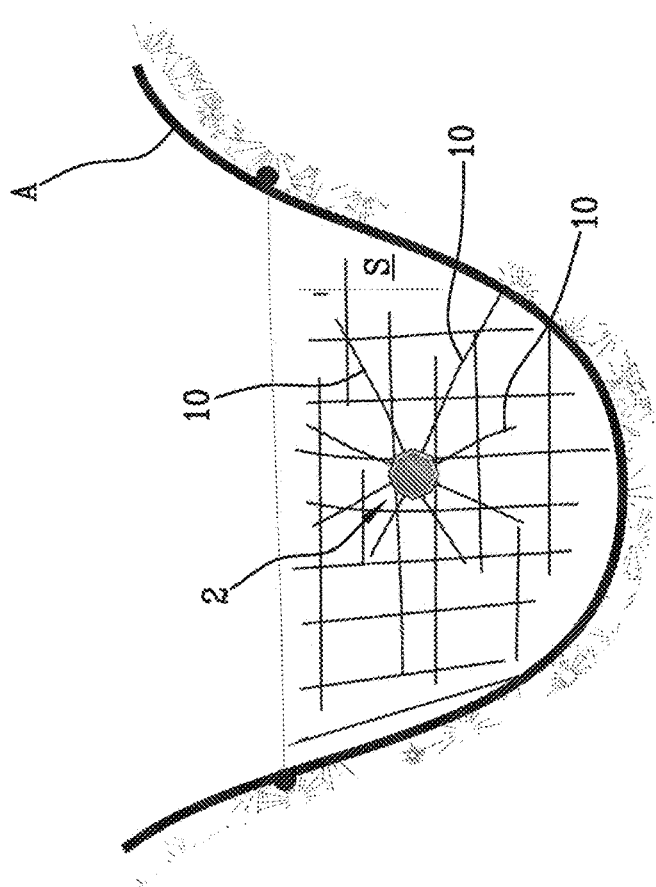
FIG. 16 shows a side view of a flexible barrier for debris flows comprising an electronic device according to the invention.

FIGS. 9 and 11 show an electronic device 2 centrally applied to a rockfall net, for example of the type that overlies many rail and road sections. The falling rocks stopped by the nets is only detected "on sight" by the operator who must walk along the affected section up to the identification of the event after it has occurred.

With the electronic device according to the invention, it is possible to immediately know the situation when the event occurs, evaluate the consistency of the phenomenon and the damage to the barrier and decide on actions, practically in real time, at a very low cost and in a simple way, but above all protecting the safety of the operator who would otherwise go to verify the situation him or herself. A safety guarantee for both those working in the maintenance and management of the structures, as well as the people, businesses and societies protected by these structures. The electronic devices are also able to independently and directly operate acoustic or visual alerting devices or both configurations, with a wide range of easy programming and setting combinations.

Figure 19:
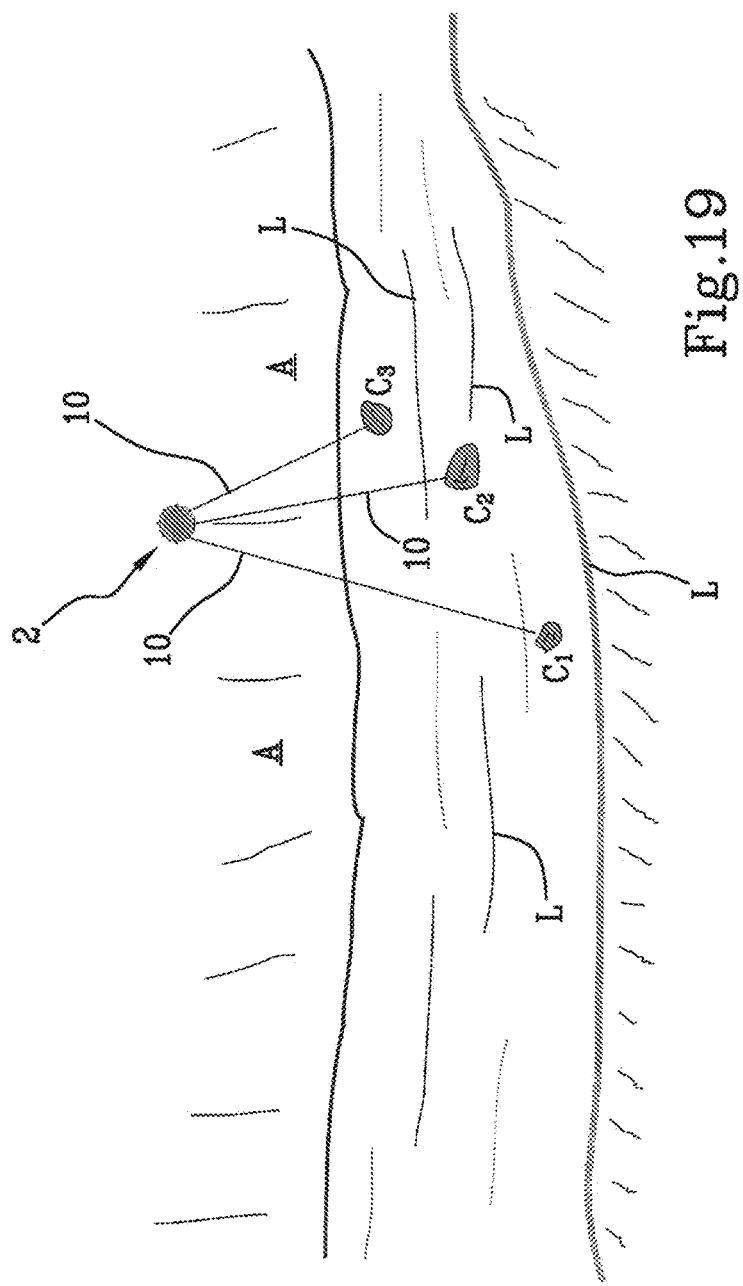
FIG. 19 shows another view of the profile of the embodiment of FIG. 18.
Figure 18:
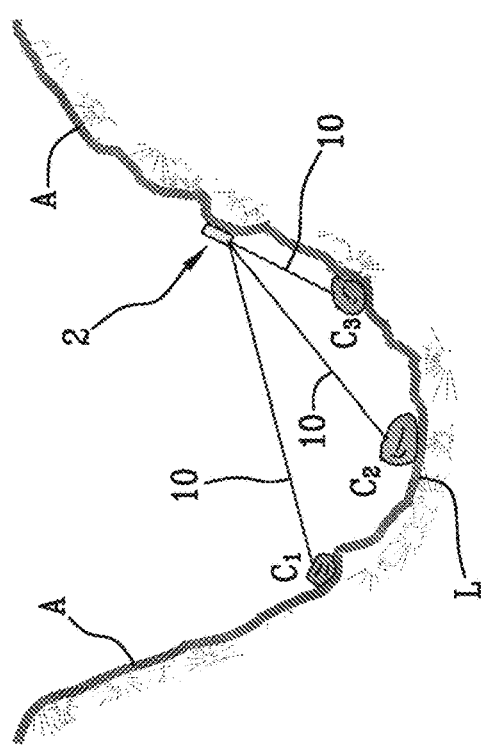
FIG. 18 shows the section of a stream in a water catchment area with an alternative embodiment of the invention for debris flows.
Figure 20:
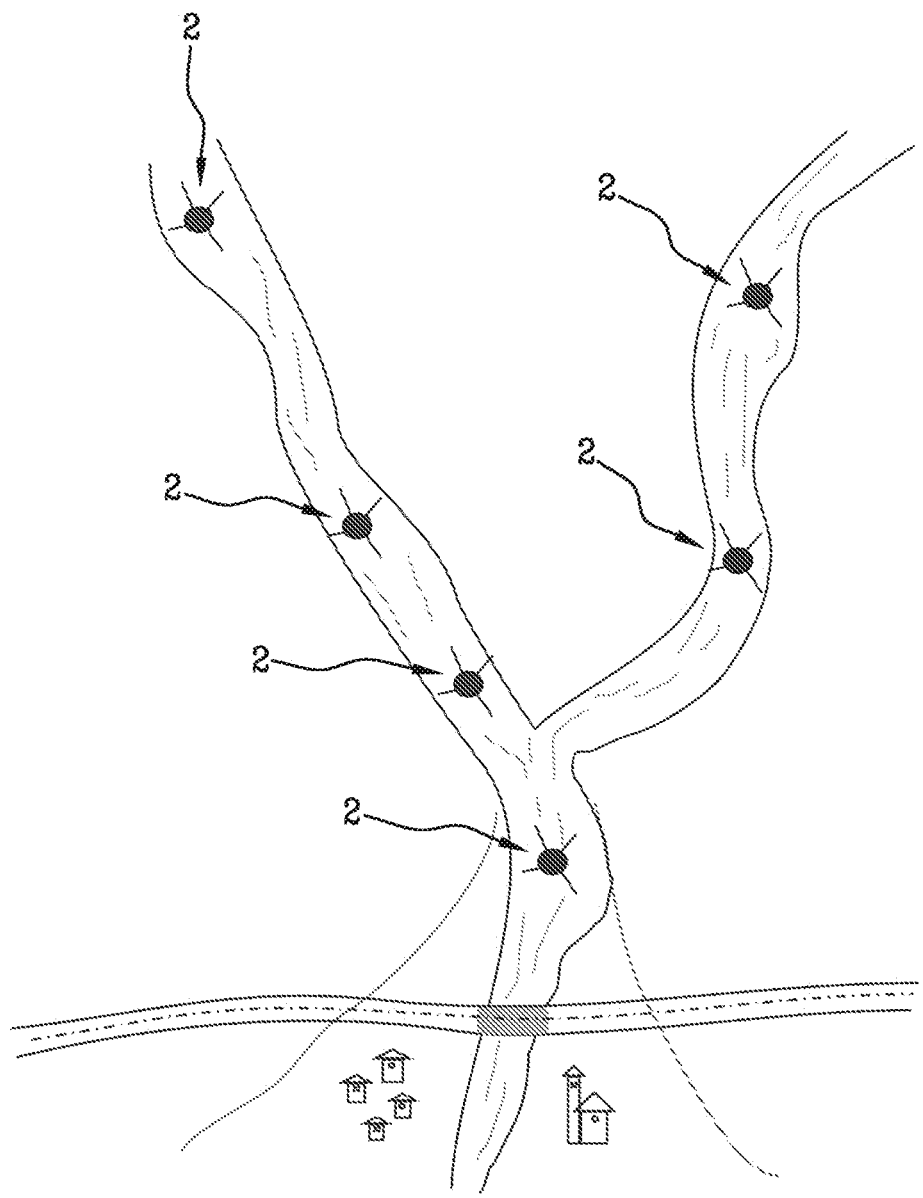
FIG. 20 shows a plan view of a plurality of electronic devices of FIGS. 18 and 19 applied along the path of a catchment basin.
Figure 22:
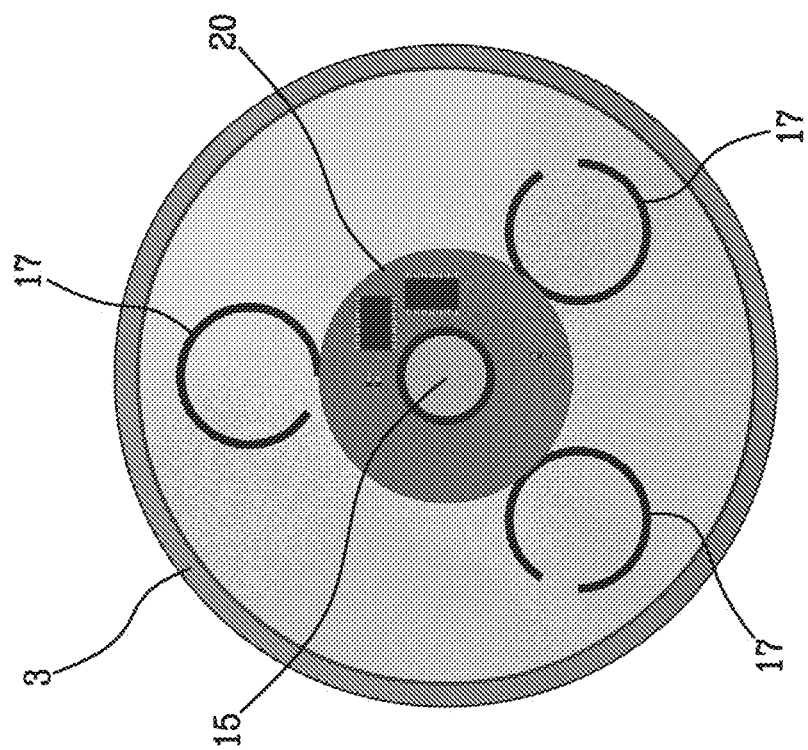
FIG. 22 shows a top view of the device of FIG. 21 without the upper cover.
Figure 21:
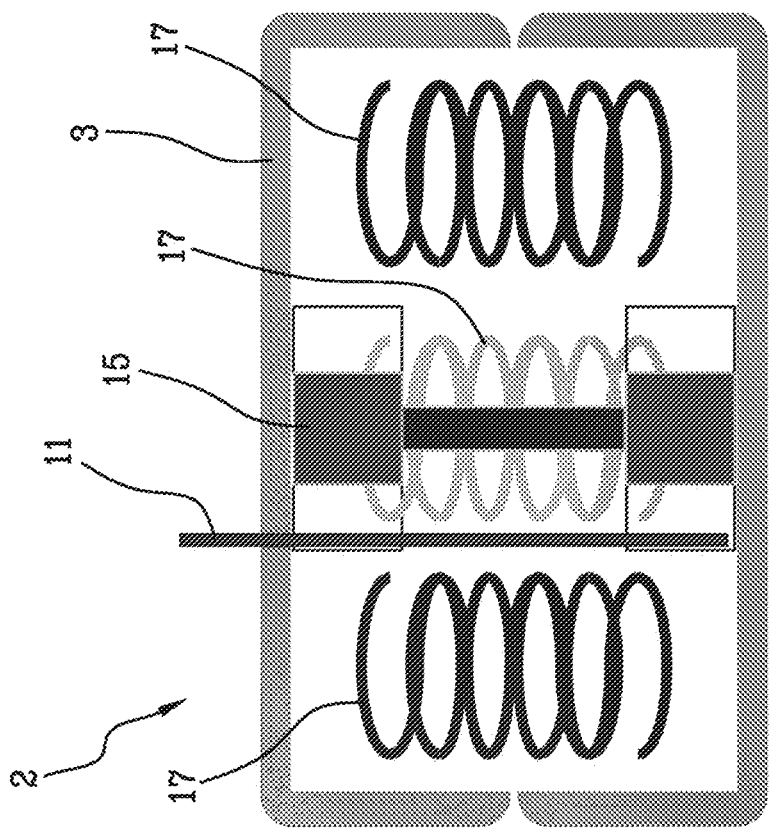
FIG. 21 shows a section side view of another embodiment of the electronic device according to the invention.

In a second aspect, the present invention relates to an electronic device 2 for monitoring hydrogeological phenomena of the debris flow type, as shown in FIGS. 18, 19 and 20. In this aspect of the invention, the electronic device 2 and the signalling legs 10 connected thereto are identical to those described above in relation to the first aspect.

In this aspect, the electronic device 2 is fixed on the side or bank A near a stream of a catchment basin which can be affected by hydrogeological phenomena, by means of non-limiting example, from possible debris flows C1, C2, C3.

In this alternative embodiment, the signalling legs 10 are held "immersed" on the bed L of the stream at various heights, for example held in position with the free end of each leg 10 connected to a boulder or other object present. In this alternative embodiment, the electronic device 2 for monitoring is not rested on the control surface S as in the other embodiments of the invention, but is placed outside of it (for example on the side or bank A), while the signalling legs 10 are oriented along a substantially oblique or perpendicular direction with respect to the surface of a possible debris flow C1, C2, C3. In particular, the signalling legs 10 extend to the bed L of the debris flow C1, C2, C3 to be monitored and are configured to transmit the mechanical load Fi acting on each of them to one of said detection elements 4a, 4b, 4c 4d.

In this way, by positioning the legs 10 of the electronic device 2 at different heights, it is possible to know the liquid passage flow rate that hits the legs 10.

Figure 3:
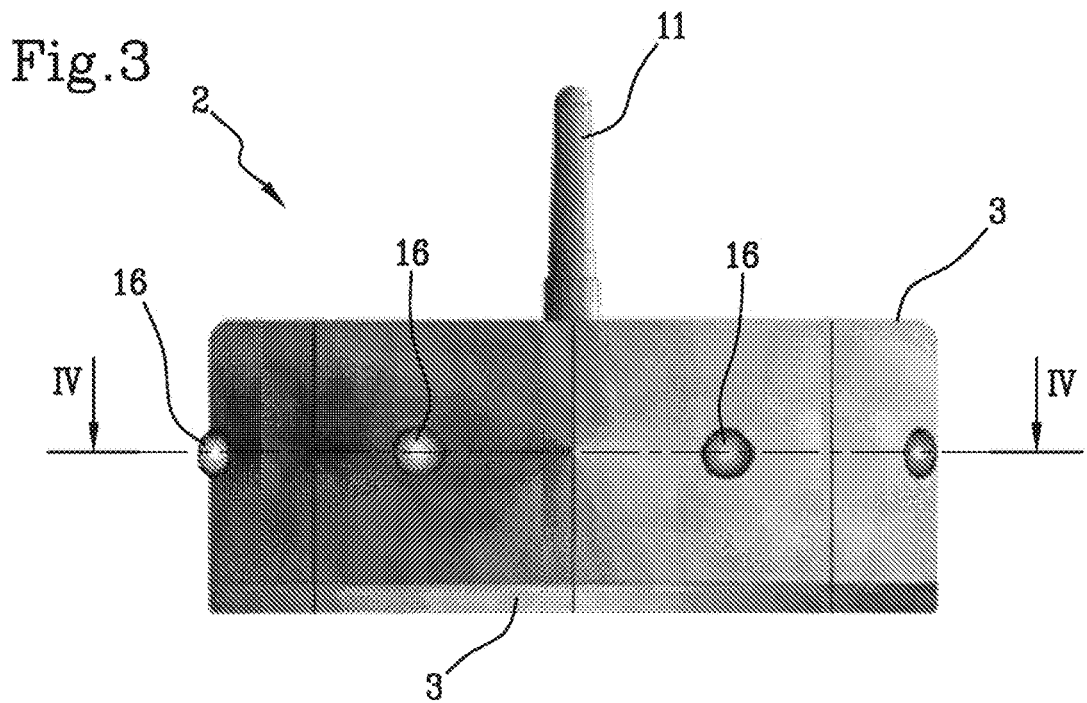
FIG. 3 shows a side view of the electronic device of FIGS. 1 and 2.
Figure 4:
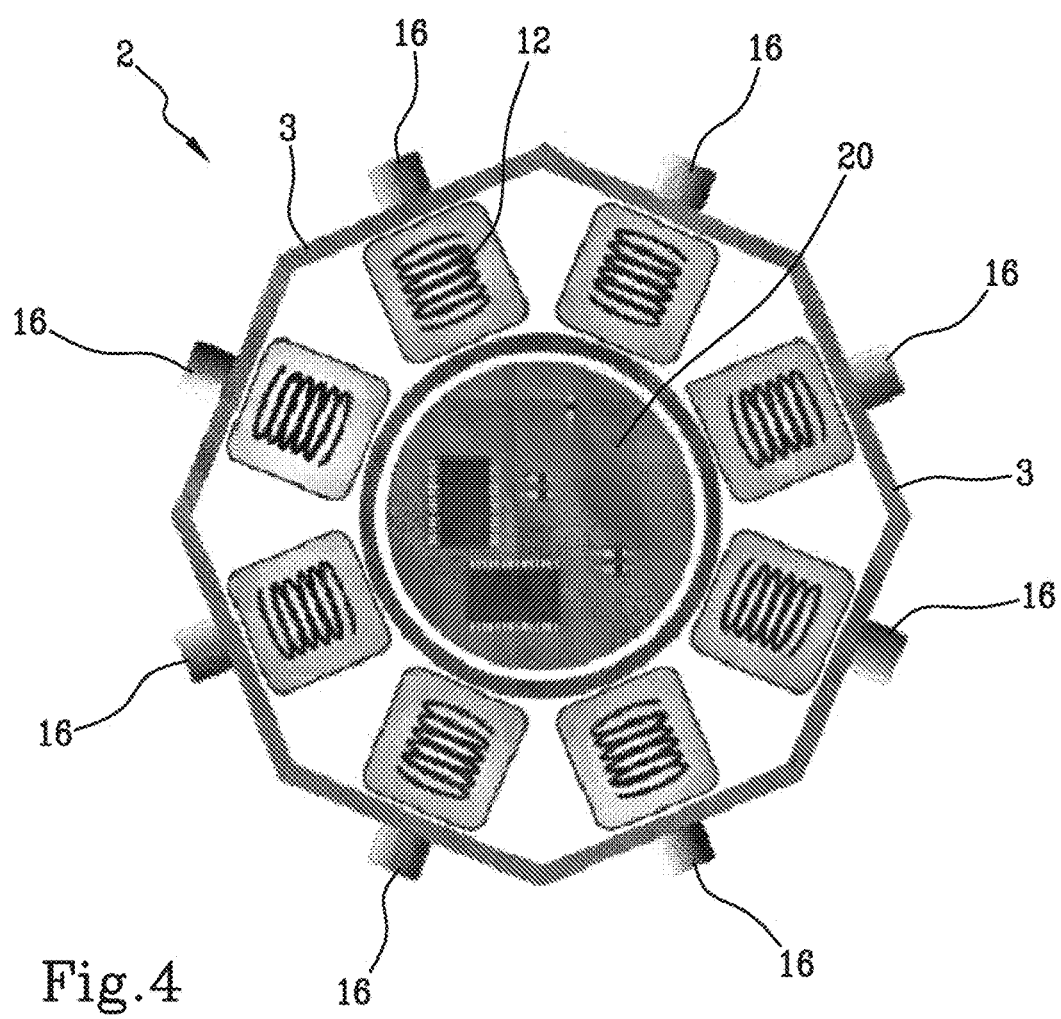
FIG. 4 shows a top view of the section IV-IV of the device of FIG. 3.
Figure 5:
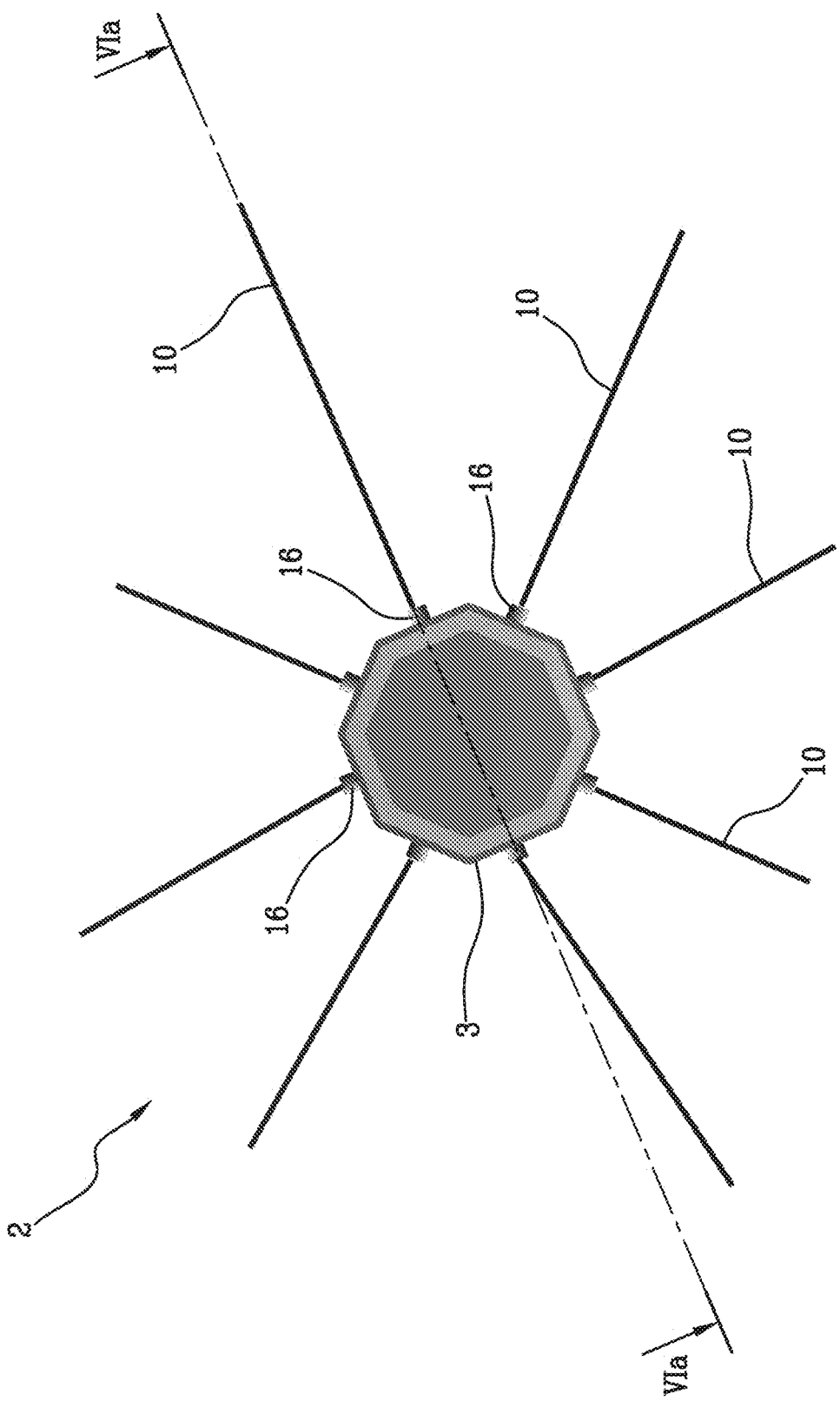
FIG. 5 shows a plan view of the electronic device comprising the signalling legs.
Figure 6A:
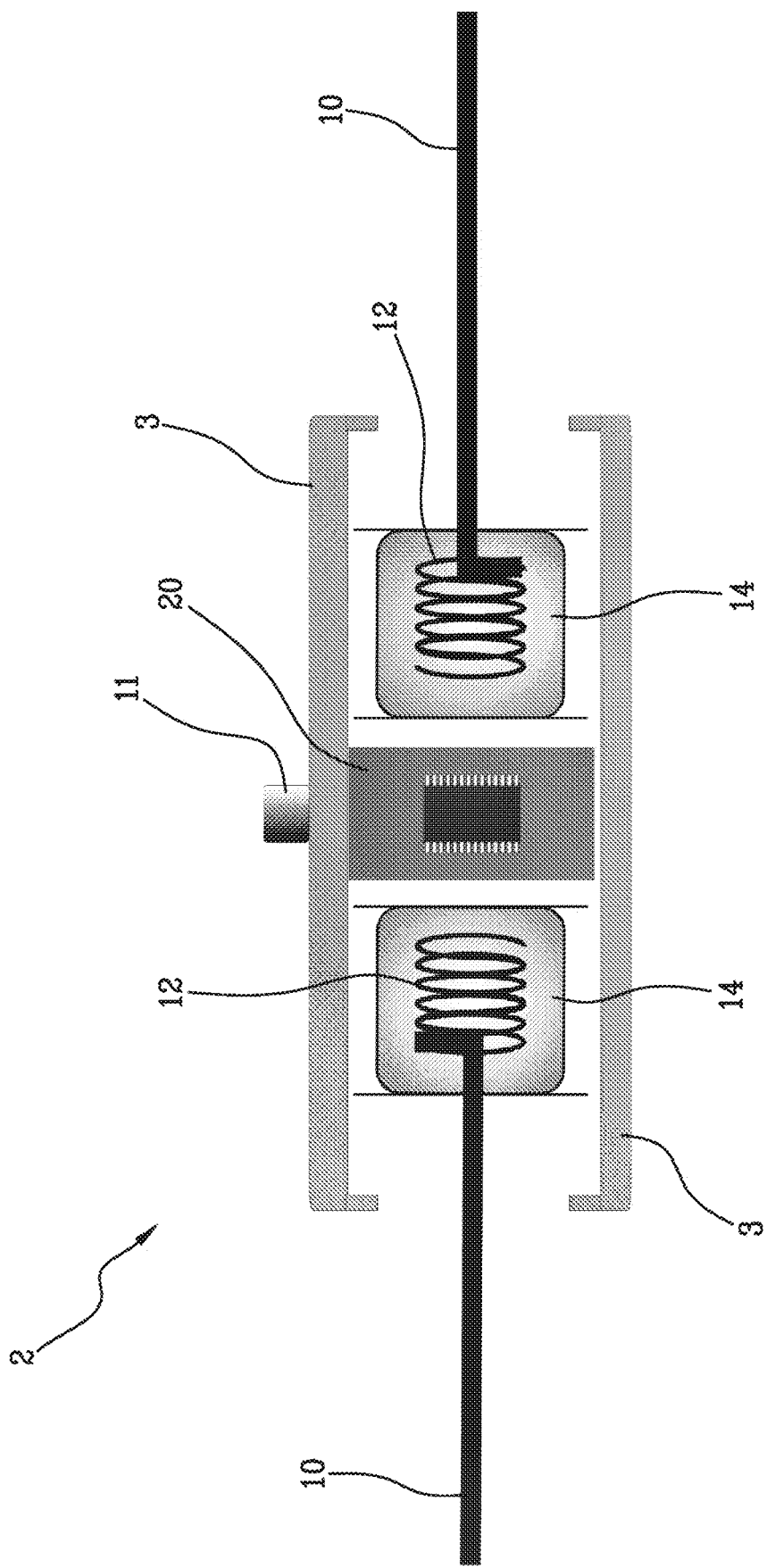
FIG. 6a shows a view of the section VIa-VIa of the device of FIG. 5.
Figure 6B:
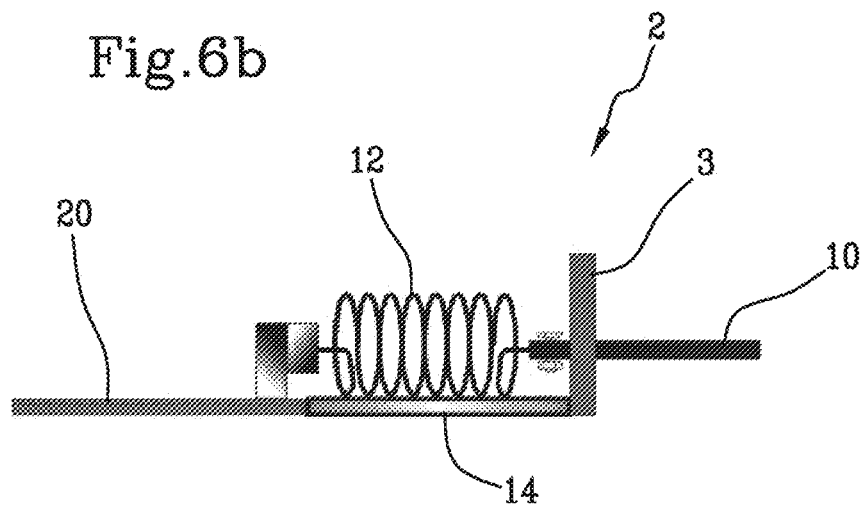
FIG. 6b shows a detail of a side view of the device of FIG. 6a, wherein the side and upper part is removed.
Figure 6C:
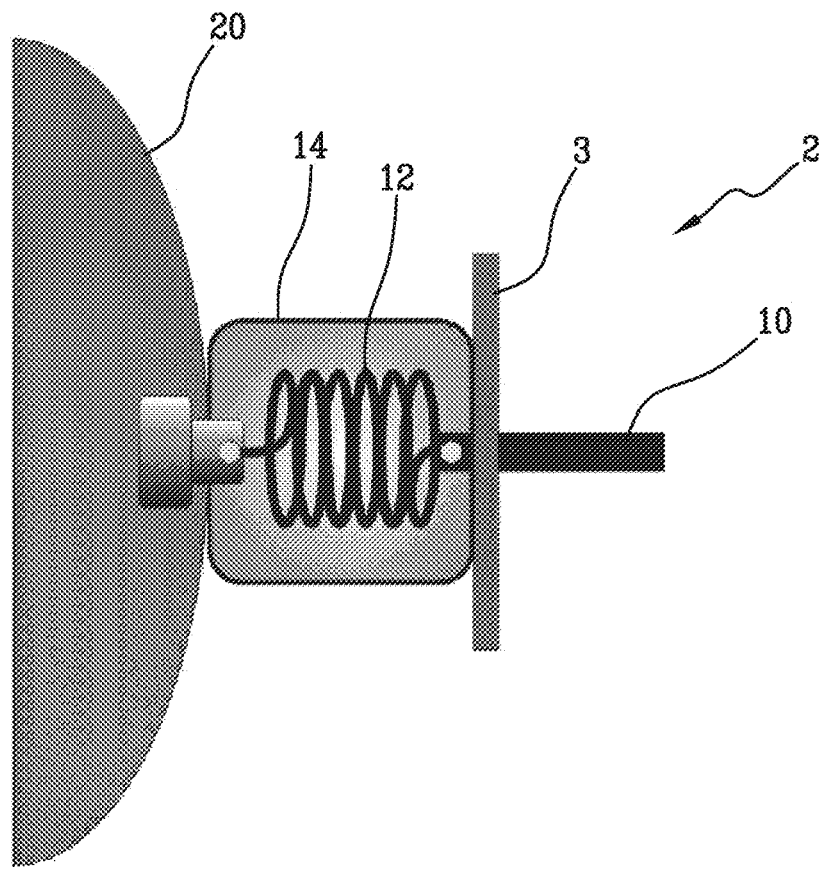
FIG. 6c shows a view from above of the detail of FIG. 6b.

In an alternative embodiment of the present invention shown in FIGS. 21, 22, 23 and 24, the electronic device 2 for monitoring hydrogeological phenomena is constituted by box-shaped casings 3a and 3b, joined by two or more connecting elements 17 and comprises a sensor or proximity transducer or accelerometer 15 and the elements already described in relation to the electronic device 2 shown in FIGS. 2, 3 and 4.

In such embodiment, in use, the lower element 3a is fixed on the control surface S (for example, a rocky volume or unstable boulder), while the signalling legs 10 extend from the upper element 3b and are fixed to an area T placed outside of the control surface S, not affected by the hydrogeological phenomena.

Preferably, the lower part 3a is fixed on the unstable surface S and solidly constrained to this.

Both the sensitivity of the signalling legs 10 and the eventual signal S_acc coming from the accelerometer determine the activation of the electronic device 2 and the sending of the alarm signal S_all.

Figure 24:
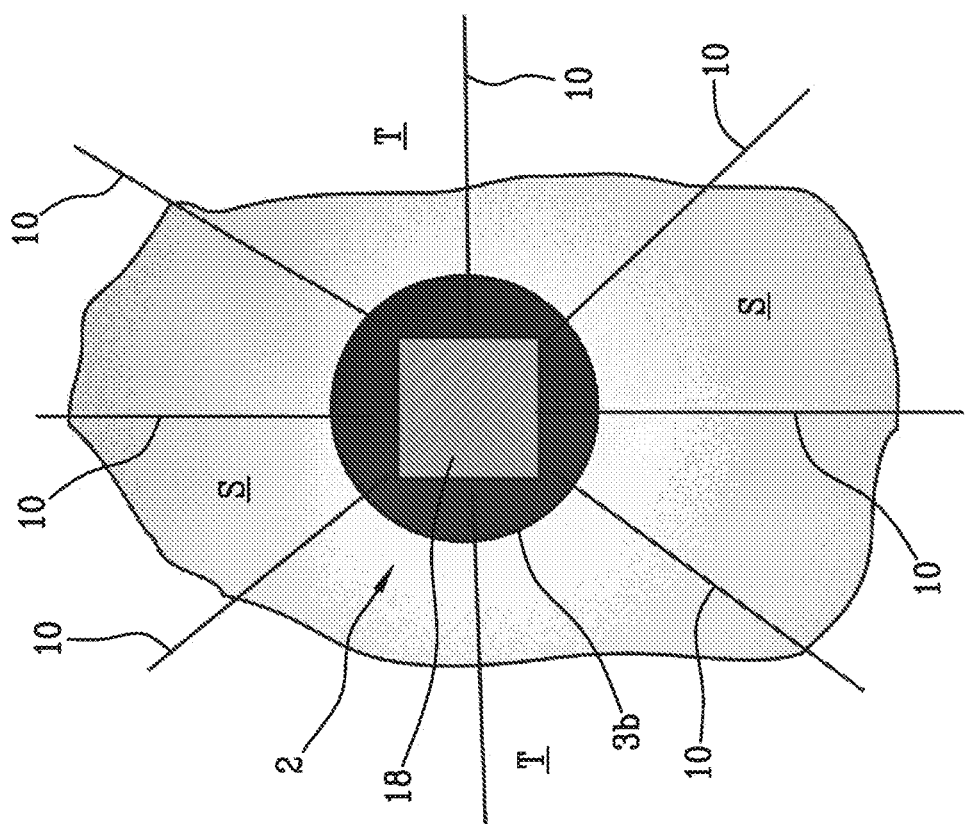
FIG. 24 shows the application of FIG. 23 in a side section view.
Figure 23:
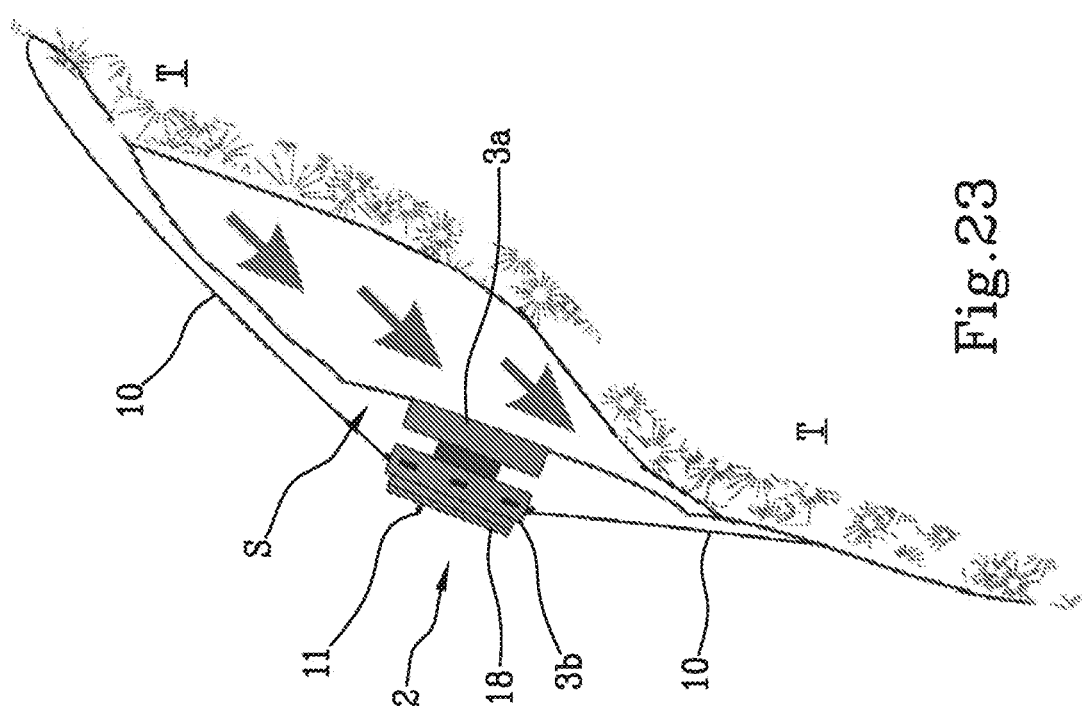
FIG. 23 shows a plan view of the application of the device of FIGS. 21 and 22 to a boulder or unstable rocky volume.

The electronic device 2 shown in FIGS. 23 and 24 can comprise a solar panel 18 arranged in the upper outer surface of the upper element 3b, and is configured to provide an additional source of electrical energy adapted to power the electronic device 2 and possibly also configured to recharge the battery 7. This will lengthen the life of the battery 7. The solar panel 18 can be present in each of the embodiments described herein.

In this embodiment, if the control surface S starts a movement or displacement, for example in the downstream direction, it moves the lower element 3a along with it, while the signalling legs 10 maintain the position of the upper element 3b fixed: a displacement towards its lower element 3a with respect to the upper element 3b is created.

FIG. 25 shows a system for monitoring hydrogeological events comprising a plurality of electronic devices 2 applied to the border of the control surface S, in such a way that some signalling legs 10 of each device 2 are fixed in the area T not affected by hydrogeological phenomena.

Figure 26:
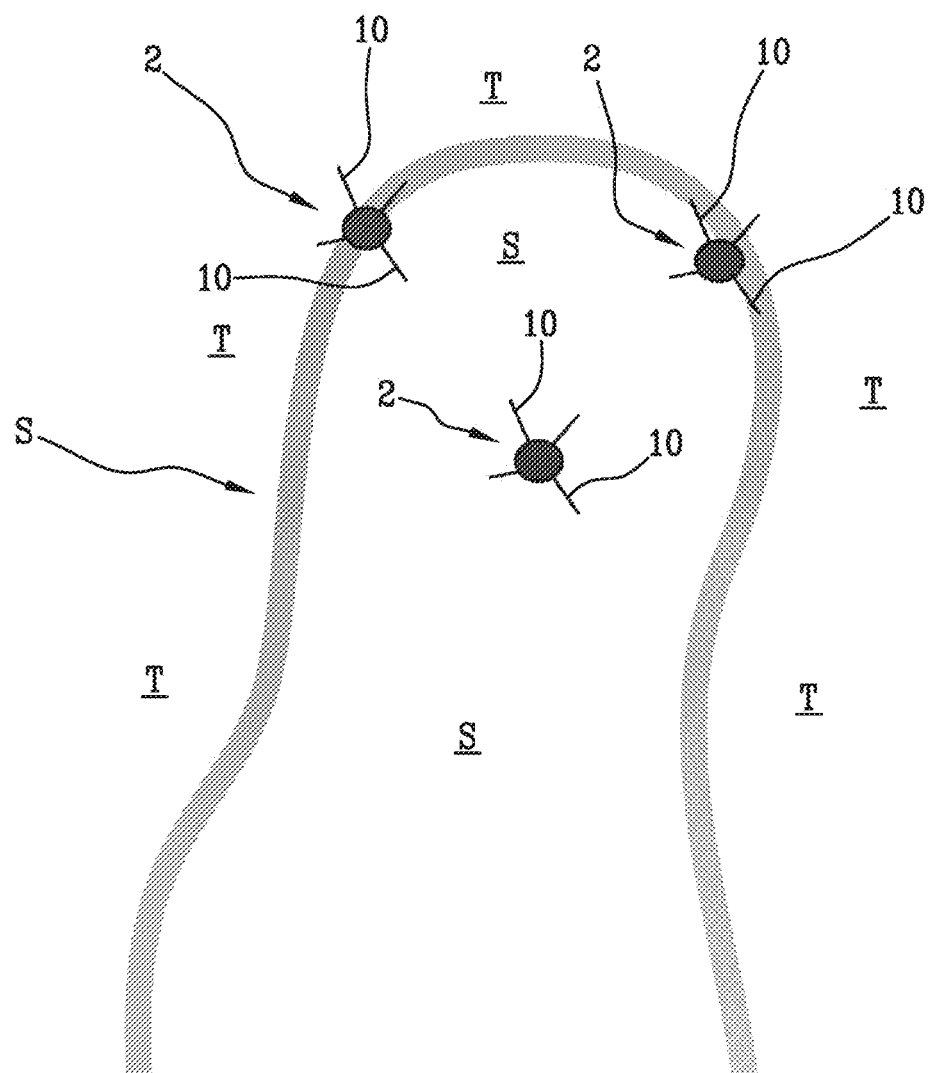
FIG. 26 shows an embodiment of the electronic device which can be applied to a snowslide.

In an alternative embodiment of the present invention shown in FIGS. 26 and 27, the electronic device 2 for monitoring is substantially similar to that shown in FIGS. 2, 3 and 4, and further comprises an elongated fixing element (such as a picket or similar element) firmly arranged on the lower surface (when in use) of the electronic device 2 for monitoring in such a way that, letting the electronic device 2 fall on the control surface S of a snowslide, it is planted on it in a stable and integral manner.

In this alternative embodiment, the signalling legs 10 are flexible and before depositing the electronic device 2 on the snowslide, are folded towards the centre of the upper surface of the electronic device 2 in such a way as not to obstruct or be damaged during the placement step on the snowslide to be monitored (usually, placed at high altitude).

In the moment when the electronic device 2 is let fall from above by gravity on the point of the snowslide to be monitored, the legs 10 are in the folded position and, at the moment of impact with the surface S of the snowslide, the legs 10 unfold in spoke-like fashion in all directions and for their entire length or extension on the control surface S to be monitored. The unfolding of the legs 10 takes place automatically with the release of a mechanical device (not shown in the figures), once the tip 24 of the device 2 comes into contact with the surface.

The spring mechanism is activated by the impact of the device with the surface to be monitored. The spring is preloaded and held in position by a lever mechanism which opens following the impact with the ground, snap releasing the spring that launches the legs or cables directly on the ground. An anchor hook at the end of each leg allows an anchoring on the snowy surface such as to allow the identification of the signal.

In another alternative embodiment of the present invention shown in FIGS. 28 and 29, the electronic device 2 is used for monitoring the instability or collapse of bank or side defenses of watercourses. Bank collapses often occur due to the presence of nutria or structural deterioration or also for incorrect realisation. To date, there are no monitoring systems if not precisely for such phenomena. Through the laying of optical fibres, the electronic device 2 allows detecting for long stretches of banks the potential deformation conditions of the side bank and allows quick reparation actions. The principle is still that of the legs 10 which in this case are much longer and made of fibre (optic, carbon) to be laid along the slopes and side banks A, with different configurations depending on the type of bank. The deformation of the detected bank corresponds to the deformation of the fibres and thus to the transmission of the alert signal S_all.

In a third aspect, the present invention relates to a system 1 for monitoring hydrogeological phenomena (FIG. 1), comprising:
  at least one electronic device 2 for monitoring hydrogeological phenomena as described herein;
  a fixed or mobile interactive electronic device 40 comprising a signal transceiver configured to receive an alarm signal Si_all indicative of the signal of the state of hydrogeological danger detected and transmitted from the transceiver 5 of one or more electronic devices 2.

The transmission of the alarm signal S_all generated by a first electronic device 2 is transmitted to the transceivers 5 of other adjacent electronic devices 2, up to reaching the transceiver of said fixed or mobile interactive electronic device 40, through a transmission of a point-point (single-band), point-to-multipoint (multi-band) or point-to-all (broadcasting) type.

In a system comprising n electronic devices 2, the identification of the i-th electronic device 2 (*i*) that has generated and transmitted a hydrogeological alarm signal Si_all takes place by means of a unique identification code cod_id sent together with the alarm signal Si_all.

Furthermore, if the electronic device 2 (*i*) is equipped with a receiver 8 of the geographical position in which it is positioned, the signal Si_pos sent together with the alarm signal Si_all allows remotely and uniquely identifying (for example on the interactive device 40) the electronic device 2 (*i*) that generated it.

In addition, in case of low battery, the electronic device 2 is able to send a low battery signal to the interactive device 40.

Similarly, in the event of a malfunction or breakdown, the electronic device 2 sends a signal to the interactive electronic device 40.

In a fourth aspect, the present invention relates to a method for monitoring hydrogeological phenomena comprising the following steps:
  a) applying at least one signalling leg 10 to a detection element 4a, 4b, 4c, 4d of an electronic device 2 for monitoring hydrogeological phenomena as previously described;

b) applying said electronic device 2 for monitoring hydrogeological phenomena and said at least one signalling leg 10 to a control surface S (or to a bank A);

c) detecting a mechanical signal Fi acting on the said surface S by means of said signalling leg 10;

d) converting said mechanical signal Fi into an electric signal Si_ril characteristic of the mechanical load acting on said control surface S;

e) receiving said electric signal Si_ril, S_mis from said detection element 4a, 4b, 4c, 4d;

f) comparing said signal Si_ril, S_mis with a corresponding threshold value SOG stored in a memory unit 6;

g) sending a hydrogeological risk alarm signal S_all to a signal transceiver 5 as a function of a verified match OK resulting from the comparison carried out by said comparison module 22;

h) transmitting said alarm signal S_all to the transceiver of a second electronic device 2 for monitoring hydrogeological phenomena or to the transceiver of a fixed or mobile interactive electronic device 40.

The present invention also relates to a kit for monitoring hydrogeological phenomena, comprising at least one electronic device 2 for monitoring as described herein and one or more signalling legs 10 that can be coupled thereto. The device can optionally be equipped with a non-volatile memory to function as a datalogger or simple detector.

Both the acquisition system and the transmission are designed with very low power consumption technology on which specific functions have been implemented which are adapted to contain the consumption and optimise the transmission with IoT protocols (SigFox, LoRa, etc.). The result is industrial-type electronics (extended temperature range) whose average consumption is in the order of microwatts/milliwatts.

The transmission of the acquired and/or processed information (depending on whether or not the datalogger function is present), can be direct in the network (point-to-network), point-to-point or point-to-multipoint, with an average coverage of several kilometres in free frequencies (for example 868 Mhz in Italy).

The transmission takes full advantage of the potential of IoT networks, allowing an average sending of at least one "still alive" signal per day in the absence of events, and an increase, also progressive, of sending periodicity upon the occurrence of an event on one of the legs.

Preferably, the signals are transmitted by means of narrow-band Internet-of-Things technology and the radio module present in the electronic device is designed in such a way as to operate with a battery autonomy of at least 3-5 years.

The radio coverage is several kilometres when it comes to point-to-point connections, and unlimited when it comes to direct connection in the Internet network.

In other words, without the use of specific radio links and with a simple and economic system, it is possible to monitor potentially dangerous events in real time, going to manage the situation that has arisen directly from the network or app. This possibility of use solves the problems existing today relating to the powering of the sensors and of the signal transceiver in the environment, especially in mountainous areas or unstable areas, where it is difficult to have energy for long periods and where the transmissions are often difficult to activate unless with very high costs.

These electronic monitoring devices allow an extensive and widespread distribution of low cost and ease of use, with an improvement of the conditions of knowledge and control of the territory and natural and human risks and therefore a better quality of life for entire communities.

The device is positioned according to the specific application, it is switched on and nothing more is necessary. In extreme and emergency conditions, some configurations of the device allow the launch or discharge from aeroplanes or helicopters, for example for the control of snowslides or surface landslides.

Apps, personal computers or control units directly provide critical information of the area on which the electronic device is installed.

The device has a compact shape (a circular container of about 25 cm in diameter or less), and is easily realisable for the simplicity with which it is made, easy to transport and even easier to install.

The sizing of the sensitive elements (springs, magnets, fibre driver, etc.) is governed by the rules that identify the energy classes to be used, therefore, on the production side a specific calibration is not necessary, rather, it becomes extremely easy to position the sensitive elements directly on the side of the electronics, closing the box-shaped container. During installation all that must be done is connecting the relative legs.

The electronic device of the present invention can easily be customised for both "calibrated" sensors at energies different from the standard ones, and realising sensors with legs differentiated for specific purposes. The connection between the legs and the electronic device takes place by means of special clamping screws on the device itself. The latter can be solidly constrained or not to the structure on which it is installed, whether it is a rigid surface or a net or other (ground).

The shape and materials used depend on the specific application, for example it is possible to insert it in floating containers, so that when faced with events such as debris flows or water avalanches, it is mainly brought to the surface to ensure the maximum probability of transmission of the signal, maximising the power in transmission.

With this type of hardware and software optimisation, the system can reduce its consumption to almost zero by allowing autonomy of up to many years with small batteries. At the same time it provides a self-diagnosis to allow the identification of failures or transmission failure.

In addition to the measurement that identifies the event and its location as well as its possible intensity (in the case of optic fibres), each transmission in fact also communicates two important points of information: the status of the battery and the geographic coordinates. The first is basic information for understanding the system's status and allows planning a possible rapid replacement of the batteries, the second allows its recovery in the case when, faced with a very important event, it has been torn or pushed away but not submerged.

The power supply source 7 envisaged is a battery, but it is possible to insert small solar panels to make the device completely autonomous with internal recharging.

As a person skilled in the art can clearly understand, the invention allows overcoming the drawbacks previously highlighted with reference to the prior art. In particular, the present invention allows improving the monitoring of hydrogeological phenomena in inaccessible areas, not reached by 2G, 3G, 4G mobile telecommunications networks or the electrical power grid. Furthermore, it allows better management and monitoring of installed devices, without having to reach them to control their operating status. Furthermore, the electronic device is compact and robust. The simplicity of the sensors and their robustness minimises maintenance activities, making the electronic device of the present invention adapted to all monitoring and alerting applications, also under extreme environmental conditions.

As described up to here, the device according to the invention is for both monitoring and alerting, as in the instant when it detects a hydrogeological risk, it sends an alarm signal and also an acoustic and visual alert signal, both from the site where it is positioned and remotely. Furthermore, the device according to the present invention not only finds use in prevention, but also and especially, in the case of a hydrogeological event and after the event. Finally, the device has an application in the field of alert management in the field of hydrogeological and engineering instability, but also by Civil Defence in an emergency, to allow operators to manage the progress of hydrological phenomena. It is clear that the specific characteristics are described in relation to different embodiments of the invention with an exemplifying and non-limiting intention. Obviously a person skilled in the art can make further modifications and variations to the present invention, for the purpose of fulfilling contingent and specific needs. For example, the technical characteristics described in relation to an embodiment of the invention can be extrapolated therefrom and applied to other embodiments of the invention. Such modifications and variations are also contained within the scope of protection of the invention, as defined by the following claims.

The invention claimed is:

1. An electronic device for monitoring hydrogeological phenomena, adapted to detect stresses of a control surface, comprising:
   a box-shaped casing configured for resting on the control surface;
   one or more detection elements configured to convert a mechanical signal into an electric signal characteristic of a mechanical load acting on the control surface;
   a plurality of signaling legs extending in a spoke-like fashion outwardly from the casing, the plurality of signaling legs extending substantially parallel to the control surface and being configured transmit the mechanical load acting on the control surface to one of the one of detection elements, each of the one or more detection elements being connected to one or more of the plurality of signalling legs;
   a signal transceiver configured to transmit and receive data;
   a memory unit storing a threshold value;
   an electrical power supply source configured to power the electronic device;
   a processing unit, connected to each of the one or more detection elements and to said signal transceiver, the processing unit being configured to process hydrogeological risk monitoring data and comprising:
      an input module configured to receive said electric signal from each of said one or more detection elements;
      a comparison module configured to compare said electric signal with a corresponding threshold value; and
      a transmission module configured to transmit to the signal transceiver an alarm signal as a function of a match resulting from a comparison carried out by said comparison module.

2. The electronic device according to claim 1, wherein at least one of the one or more detection elements comprises an element configured to measure the mechanical load and to generate a signal characteristic of the mechanical load acting on the control surface.

3. The electronic device according to claim 1, wherein the plurality of signalling legs comprises one or more of the following:
   bars;
   cables;
   wires; and/or
   optic fiber cables.

4. The electronic device according to claim 1, wherein the plurality of signalling legs comprises eight signalling legs.

5. The electronic device according to claim 1, wherein the electronic device is usable with one or more of the following:
   a rockfall protection barrier;
   an adhering net or panel;
   a flexible debris barrier;
   a debris flow;
   a surface landslide;
   a snowslide; and/or
   a bank.

6. The electronic device according to claim 1, wherein the signal transceiver is configured to connect to an interactive electronic device by a long-range telecommunications network.

7. The electronic device according to claim 1, wherein the signal transceiver is configured to transmit and receive data from a signal transceiver of an additional electronic device.

8. The electronic device according to claim 1, comprising means adapted to determine a geographical position of the electronic device and generate a signal indicating said geographical position.

9. The electronic device according to claim 1, wherein said processing unit is configured to switch, as a function of electric signals received from one of the one or more detection elements, a status of the electronic device from a normal functioning mode, in which normal functioning mode the signal transceiver of the electronic device is able to transmit signals, to a standby mode, during which standby mode the electronic device functions by minimizing consumption of electrical energy generated by the electrical power supply source.

10. The electronic device according to claim 1, wherein each of the plurality of signalling legs are configured for physical coupling to the control surface.

11. An electronic device for monitoring hydrogeological phenomena adapted to detect stresses of debris flows, comprising:
   a box-shaped casing configured for resting on a side or a bank of a water course affected by passage of a debris flow;
   one or more detection elements configured to convert a mechanical signal into an electric signal characteristic of a mechanical load;
   a signal transceiver configured to transmit and receive data;
   a memory unit storing a threshold value;
   an electrical power supply source configured to supply power to the electronic device;
   a processing unit connected to each of the one or more detection elements and to said signal transceiver, the processing unit being configured to process hydrogeological risk monitoring data and comprising:
      an input module configured to receive said electric signal from each of said one or more detection elements;
      a comparison module configured to compare said electric signal with a corresponding threshold value; and a transmission module configured to transmit to the signal transceiver an alarm signal as a function of a match resulting from a comparison carried out by said comparison module;

the electronic device further comprising a plurality of signalling legs extending to a bed of the debris flow to be monitored and being configured to transmit mechanical load acting on each of plurality of signalling legs to one of the one or more detection elements, the plurality od signalling legs extending in a spoke-like fashion outwardly rom the casing and being immersed in a bed of the water course at various heights and oriented along a substantially oblique direction or in a perpendicular direction with respect to a surface of a possible debris flow, each of the one or more detection elements being connected to one or more of the plurality of signalling legs.

12. The electronic device according to claim 11, wherein a free end of each of the plurality of signalling leg is physically connected to a heavy object resting on the bed of the water course.

13. A monitoring system for monitoring hydrogeological phenomena, comprising:
at least one electronic device for monitoring hydrogeological phenomena, comprising:
a box-shaped casing configured for resting on a control surface;
one or more detection elements configured to convert a mechanical signal into an electric signal characteristics of a mechanical load acting on the control surface;
a plurality of signalling legs extending in a spoke-like fashion outwardly from the casing, the plurality of signalling legs extending substantially parallel to the control surface and being configured to transmit the mechanical load acting on the control surface to one of the one or more detection elements, each of the one or more detection elements being connected to one or more of the plurality of signalling legs;
a signal transceiver configured to transmit and receive data;
a memory unit storing a threshold value;
an electrical power supply source configured to power the at least one electronic device for monitoring hydrogeological phenomena;
a processing unit connected to each of the one or more detection elements and to said signal transceiver, the processing unit being configured to process hydrogeological risk monitoring data and comprising:
an input module configured to receive said electric signal from each of said one or more detection elements;
a comparison module configured to compare said electric signal with a corresponding threshold value; and
a transmission module configured to transmit to the signal transceiver an alarm signal as a function of match resulting from a comparison carried out by said Comparison module;
the monitoring system further comprising a mobile or fixed interactive electronic device comprising a signal transceiver configured to receive an alarm signal indicating a hydrogeological danger status detected and transmitted to the signal transceiver of the interactive electronic device by the at least one electronic device for monitoring hydrogeological phenomena.

14. The monitoring system according to claim 13, comprising a long-range telecommunications network configured to connect the interactive electronic device with the at least one electronic device for monitoring hydrogeological phenomena.

15. The monitoring system according to claim 13, wherein the at least one electronic device for monitoring hydrogeological phenomena comprises a plurality of electronic devices for monitoring hydrogeological phenomena, wherein a transmission of the alarm signal generated by a first of the plurality of electronic devices for monitoring hydrogeological phenomena is transmitted to the signal transceivers of other one of the plurality of electronic devices for monitoring hydrogeological phenomena, up to reaching the signal transceiver of said interactive electronic device, via a transmission of at least one of the following types:
point-to-point;
point-to-multipoint; and/or
point-to-all points.

16. The monitoring system according to claim 13, wherein each of the plurality of signalling legs are configured for physical coupling to the control surface.

17. A method for monitoring hydrogeological phenomena, comprising the following steps:
providing at least one electronic device for monitoring hydrogeological phenomena adapted to detect stresses of a control surface, the electronic device comprising:
one or more detection elements configured to convert a mechanical signal into an electric signal characteristic of a mechanical load acting on the control surface;
a plurality of signalling legs extending in a spoke-like fashion outwardly from the at least one electronic device, the plurality of signalling legs extending substantially parallel to the control surface and being configured to transmit the mechanical load acting on the control surface to one of the one or more detection elements;
a signal transceiver configured to transmit and receive data;
a memory unit storing a threshold value;
a processing unit connected to each of the one or more detection elements and to said signal transceiver, the processing unit being configured to process hydrogeological risk monitoring data and comprising:
a comparison module configured to compare said electric signal with a corresponding threshold value; and
a transmission module configured to transmit to the signal transceiver an alarm signal as a function of a match resulting from a comparison carried out by said comparison module;
connecting each of the one or more detection elements to one or more of the plurality of signalling legs;
resting the at least one electronic device for monitoring hydrogeological phenomena and the plurality of signalling legs on the control surface;
detecting a mechanical load acting on the control surface with at least one of the plurality of signalling legs;
converting a mechanical signal characteristic of the mechanical load into an electric signal characteristic of the mechanical load acting on the control surface;
receiving said electric signal from the one or more detection elements;
comparing said electric signal with the corresponding threshold value stored in the memory unit;

sending a hydrogeological risk alarm signal to the signal transceiver as a function of a verified match resulting from a comparison carried out by said comparison module; and transmitting said alarm signal to the signal transceiver of a second one of the at least one electronic device for monitoring hydrogeological phenomena or to the signal transceiver of a fixed or mobile interactive electronic device.

18. The method according to claim 17, further including the step of physically coupling at least one of the plurality of signalling legs to the control surface.

* * * * *